(12) United States Patent
Berkley et al.

(10) Patent No.: US 8,378,968 B2
(45) Date of Patent: Feb. 19, 2013

(54) METHOD, APPARATUS, AND ARTICLE FOR FORCE FEEDBACK BASED ON TENSION CONTROL AND TRACKING THROUGH CABLES

(75) Inventors: Jeffrey J. Berkley, Seattle, WA (US); Marc Vollenweider, Kirkland, WA (US); Seahak Kim, Seoul (KR)

(73) Assignee: Mimic Technologies, Inc., Seattle, WA (US)

( * ) Notice: Subject to any disclaimer, the term of this patent is extended or adjusted under 35 U.S.C. 154(b) by 0 days.

(21) Appl. No.: 13/538,790

(22) Filed: Jun. 29, 2012

(65) Prior Publication Data

US 2012/0268368 A1 Oct. 25, 2012

Related U.S. Application Data

(63) Continuation of application No. 13/242,869, filed on Sep. 23, 2011, which is a continuation of application No. 11/947,398, filed on Nov. 29, 2007, now Pat. No. 8,054,289.

(60) Provisional application No. 60/868,318, filed on Dec. 1, 2006.

(51) Int. Cl.
*G09G 5/00* (2006.01)

(52) U.S. Cl. .......................... 345/156; 345/157; 345/158

(58) Field of Classification Search .......... 345/156–163; 434/262; 703/4
See application file for complete search history.

(56) References Cited

U.S. PATENT DOCUMENTS

| | | | |
|---|---|---|---|
| 4,280,605 A | 7/1981 | Papadopoulos | |
| 5,248,960 A | 9/1993 | Hamma | |
| 5,305,429 A | 4/1994 | Sato et al. | |
| 5,389,865 A | 2/1995 | Jacobus et al. | |
| 5,440,476 A | 8/1995 | Lefkowitz et al. | |
| 5,576,727 A | 11/1996 | Rosenberg et al. | |
| 5,577,981 A | 11/1996 | Jarvik | |
| 5,587,937 A | 12/1996 | Massie et al. | |
| 5,709,219 A | 1/1998 | Chen et al. | |
| 5,828,813 A | 10/1998 | Ohm | |
| 6,104,379 A | 8/2000 | Petrich et al. | |
| 6,104,380 A | 8/2000 | Stork et al. | |
| 6,113,395 A | 9/2000 | Hon | |
| 6,281,651 B1 | 8/2001 | Haanpaa et al. | |
| 6,385,509 B2 | 5/2002 | Das et al. | |
| 6,394,998 B1 | 5/2002 | Wallace et al. | |
| 6,413,229 B1 | 7/2002 | Kramer et al. | |
| 6,417,638 B1 | 7/2002 | Guy et al. | |
| 6,587,749 B2 | 7/2003 | Matsumoto | |
| 6,630,923 B2 | 10/2003 | Sato | |
| 6,704,001 B1 | 3/2004 | Schena et al. | |
| 6,704,694 B1 | 3/2004 | Basdogan et al. | |
| 6,879,315 B2 | 4/2005 | Guy et al. | |

(Continued)

FOREIGN PATENT DOCUMENTS

JP 2006024041 A 1/2006
WO WO2004088467 A2 10/2004

OTHER PUBLICATIONS

CyberGlove II, URL=http://www.cyberglovesystems.com/products/cyberglove-iiioverview, download date Aug. 9, 2010, 1 page.

(Continued)

*Primary Examiner* — Amare Mengistu
*Assistant Examiner* — Premal Patel
(74) *Attorney, Agent, or Firm* — Lee & Hayes, PLLC

(57) ABSTRACT

A haptic interface system includes a cable based haptic interface device and a controller. The controller receives information related to movement of a grip in real-space and generates a stereoscopic output for a display device. The stereoscopic output includes images of a virtual reality tool whose motions mimic motions of the real-space grip.

27 Claims, 9 Drawing Sheets

U.S. PATENT DOCUMENTS

| | | | |
|---|---|---|---|
| 7,331,967 B2 * | 2/2008 | Lee et al. ................. | 606/130 |
| 7,404,716 B2 | 7/2008 | Gregorio et al. | |
| 8,054,289 B2 | 11/2011 | Berkley et al. | |
| 2001/0038376 A1 | 11/2001 | Sato | |
| 2003/0068607 A1 | 4/2003 | Gregorio et al. | |
| 2005/0024331 A1 | 2/2005 | Berkley et al. | |
| 2005/0183532 A1 | 8/2005 | Najafi et al. | |
| 2005/0222830 A1 | 10/2005 | Massie et al. | |
| 2008/0150891 A1 | 6/2008 | Berkley et al. | |
| 2011/0084943 A1 | 4/2011 | Berkley et al. | |
| 2011/0213383 A1 | 9/2011 | Lee et al. | |

OTHER PUBLICATIONS

Ben-Ur, "Development of a Force-Feedback Laparoscopic Surgery Simulator," Master's Thesis, Massachusetts Institute of Technology, Sep. 1999,114 pages.

Hashimoto et al., "Development of Haptic Device on a Human-Scale Virtual Reality Environment," Human Interface 2000 Tsukuba, Sep. 2000, pp. 423-426.

Hashimoto et al., "Intuitive and Effective 3-D Modeler in CAVE," IErC Technical Report 99(184):9-16, Jul. 1999 (English Abstract only).

Hatano et al., "Six Degree of Freedom Master Using Eight Tensed Strings," Proceedings of the Eighth International Symposium on Measurement and Control in Robotics, Jun. 8-12, 1998, Prague, Czechoslovakia, pp. 251-255.

Iishi et al., "Force Sensations in Pick-and-Place Tasks," Dynamic Systems and Control—ASME Nov. 1994, DSC—vol. 55-1, pp. 339-344.

International Search Report, mailed Feb. 3, 2005, for PCT/US2004/009295, 1 page.

Ottensmeyer et al., "Input and Output for Surgical Simulation: Devices to Measure Tissue Properties in vivo and a Haptic Interface for Laparoscopy Simulators," Medicine Meets Virtual Reality Jan. 2000, pp. 236-242.

Written Opinion, mailed Feb. 3, 2005, for PCT/US2004/009295, 4 pages.

U.S. Appl. No. 13/242,869, filed Sep. 23, 2011, Jeffrey J. Berkley, Seahak Kim, Marc Vollenweider, 45 pgs.

MPB Technologies Inc., "6 DOF Haptic Interface," retrieved Feb. 22, 2010, from http://www.mpb-technologies.ca/mpbt/mpbt web 20091 enl6doflindex.html, 5 pages.

MPB Technologies Inc., "7 DOF Haptic Interface," retrieved Feb. 22, 2010, from, http://www.mpb-technologies.ca/mpbt/mpbt web 20091 enl7dof/features.html, 5 pages.

Berkelman et al. "Design of a Hemispherical Magnetic Levitation Haptic Interface," 1996 ASME Mechanical Engineering Congress and Exposition, Atlanta, Nov. 17-22, 1996, DSC—vol. 58 pp. 483-488.

Bouguila et al., "New Haptic Device for Human-Scale Virtual Environment: Scaleable-SPIDAR," International Conference on Artificial Reality and Tele-Existence (ICAT97), Mar. 1997 Tokyo,lapan,pp. 93-98.

Brooks, et al., "Project GROPE—Haptic Displays for Scientific Visualization," Aug. 1990, Computer Graphics 24 (4):177-185.

"CyberGrasp TM Exoskeleton" Immersion Corporation—3D Interaction: Products, http://www.immersion,com/3d/products/cyber_grasph, php, download date of Nov. 16, 2006, 4 pgs.

Fabiani et al., "Human Interface Using the Rutgers Master II Force Feedback Interface", Proceedings of VRAIS Mar. and Apr. 1996, pp. 54-59.

Gomez et al., "Integration of the Rutgers Master II in a Virtual Reality Simulation," Proceedings of the Virtual Reality Annual International Symposium (VRAIS), Mar. 1995, pp. 198-202.

"Industrial Controls", Immersion Corporation, http://www,immersion,comlindustrial/joystick/impulse engine,php, download date of Nov. 16, 2006, 1 pgs.

Inoue et al., "A New Force Computation Method for Wire Driven Force Display," Jan. 2001, The Institute of Image Information and Television Engineers, HIR 2001-54, NIM 2001-63, 6 pages.

Ishii et al, "A 3D Spatial Interface Device Using Tensed Strings," Presence, vol. 3 No. 1, Winter 1994, pp. 81-86.

Ishii et al., "Networked SPIDAR: A Networked Virtual Environment with Visual, Auditory, and Haptic Interaction," Presence, vol. 3 No. 4, Fall 1994, pp. 351-359.

Iwata, "Artificial Reality with Force-feedback: Development of Desktop Virtual Space with Compact Master Manipulator," Computer Graphics, vol. 24, No. 4, Aug. 1990, pp. 165-170.

Jackson et al., "Force Feedback and Medical Simulation," Book Chapter, Interactive Technology and the New Paradigm for Healthcare, IOS Press and Ohmsha, 1995, pp. 147-151.

Kawamura et ai., "A New Type of Master Robot for Teleoperation Using a Radial Wire Drive System," Proceedings of the 1993 IEEE RSJ International Conference on Intelligent Robots and Systems, Yokohama, Japan, Jul. 1993, pp. 55-60.

Kawamura et ai., "Development of an Ultrahigh Speed Robot FALCON using Wire Drive Systems," IEEE International Conference on Robotics and Automation, May 1995, pp. 215-220.

Kim et al., "A Novel Seven Degree of Freedom Haptic Device for Engineering Design," Journal of Virtual Reality, Springer-Verlag London Ltd UK, 2003, pp. 217-228.

Kim, "A Proposal of 7 DOFs Force Display: SPIDAR-G", Ph.D dissertation, Tokyo Institute of Technology, Dec. 2004, 102 pages.

Kim, et al., "Design of a Tension Based Haptic Interface SPIDAR-G," IMECE2000 Joint with ASME2000, DSC—vol. 69-2, Proceedings of the ASME, Nov. 5-10, 2000, Orlando, FL, USA, 4 pages.

Kim et al., "Cutting Edge Force-Feedback Device: SPIDAR-G," Proceedings of the 32nd ISR (International Symposium on Robotics), Apr. 19-21, 2001, Seoul, Korea, pp. 1771-1776.

Kim et al., "Development of Tension Based Haptic Interface and Possibility of its Application to Virtual Reality," VRST2000, Oct. 22-25, 2000, Seoul, Korea, pp. 199-205.

Kim et al., "Haptic Interface with 7 DOF Using 8 Strings: SPIDAR-G," ICAT2000, Oct. 25-27, 2000, National Taiwan University, Tawain, 7 pages.

Kim, et al, "Design of a Tension Based Haptic Interface SPIDAR-G," 4th World Multiconference on Systemics, Cybernetics and Informatics (SC12000) and the 6th Internation Conference on Information Systems Analysis and Synthesis (ISAS2000), Orando, FL, USA, in Jul. 23-26, 2000,6 pages.

Kim et ai., "Personal VR System for Rehabilitation to Hand Movement," ICAT98, Aug. 1998, pp. 102-108.

Kim et al., "Tension Based 7 DOFs Force Feedback Devices: SPIDAR-G," Transactions on Control, Automation, and Systems Engineering vol. 4, No. 1, Mar. 2002, pp. 9-16.

Kim et al., "Tension Based 7-DOF Force Feedback Device: SPIDAR-G," Proceedings of the IEEE Virtual Reality 2002, Mar. 24-28, 2002, Orlando, FL, USA, 2 pages.

Kushida et ai., "A Proposal of Free Form Modeling Method Based on Glass-work Metahphor," The Institute of Electronics, Information and Communication Engineers, Technical Report of IEICE, MVE2000-33, Jun. 2006, pp. 11-17.

Massie, "Design of a Three Degree of Freedom Force-Reflecting Haptic Interface," Bachelor of Science Thesis, Massachusetts Institute of Technology, May 1993, 39 pages.

Sato et ai., "A Proposal of 7 DOF Force Display Using 8 Strings", The Institute of Image Information and Television Engineers, HIR2000-100, NIM2000-100, Jun. 2000, 6 pages.

Sato, "Haptic Interface SPIDAR," Japanese publication, 7 pages, date unknown.

Sato et ai., "Space Interface Device for Artificial Reality—SPIDAR," Systems and Computers in Japan, Voi. 23, No. 12, pp. 44-54, 1992, Translated from Denahi Joho Tsushin Gakkai Ronbunshi, Voi. 74-D-II, No. 7, Jul. 1991, pp. 887-894.

CyVerse Corp "SPIDAR (CyDar) Information", http://www,cyverse.co,jp/eng! and http://www,cyverse,co,jp/Products/spidar.html, download dates of Nov. 16, 2006, 15 pgs.

"The Phantom Haptics Interfaces: A Device for Probing Virtual Objects," SensAble Technologies, http://www.sensable.com/community/asme.htm. download date of Nov. 16, 2006, Proc ASME Winter Annual Mtg, Symposium on Haptic Interfaces for Virtual Environment and Teleoperator Systems, Nov. 1994. 8 pgs.

Turner et ai., "Preliminary Tests of an Arm-Grounded Haptic Feedback Device in Telemanipulation," Proceedings of the ASME IMECE Haptics Symposium, Anaheim, CA, Nov. 1998, 5 pages.

Walairacht et al., "Two-Handed Multi-Fingers String-Based Haptic Interface Device," IEICE Trans. Inf. & Syst., vol. E 84-D, No. 3 Mar. 2001, pp. 365-373.

Non-Final Office Action for U.S. Appl. No. 13/242,869, mailed on Dec. 16, 2011, Jeffrey J. Berkley et al., "Methods, Apparatus, and Article for Force Feedback Based on Tension Control and Tracking Through Cables", 18 pages.

* cited by examiner

METHOD, APPARATUS, AND ARTICLE FOR FORCE FEEDBACK BASED ON TENSION CONTROL AND TRACKING THROUGH CABLES

CROSS-REFERENCE TO RELATED APPLICATIONS

This continuation application claims priority from, commonly owned U.S. patent application Ser. No. 13/242,869, filed Sep. 23, 2011, which is a continuation of U.S. patent application Ser. No. 11/947,398, filed Nov. 29, 2007, issued as U.S. Pat. No. 8,054,289 on Nov. 8, 2011, and titled "Method, Apparatus, and Article for Force Feedback Based on Tension Control and Tracking Through Cables", which claims priority from U.S. Provisional Application No. 60/868,318, filed Dec. 1, 2006, which applications are herein incorporated in their entirety by reference.

BACKGROUND

1. Technical Field

The disclosure is generally related to haptic systems employing force feedback.

2. Description of the Related Art

Touch, or haptic interaction is a fundamental way in which people perceive and effect change in the world around them. Our very understanding of the physics and geometry of the world begins by touching and physically interacting with objects in our environment. The human hand is a versatile organ that is able to press, grasp, squeeze or stroke objects; it can explore object properties such as surface texture, shape and softness; and it can manipulate tools such as a pen or wrench. Moreover, touch interaction differs fundamentally from all other sensory modalities in that it is intrinsically bilateral. We exchange energy between the physical world and ourselves as we push on it and it pushes back. Our ability to paint, sculpt and play musical instruments, among other things depends on physically performing the task and learning from the interactions.

Haptics is a recent enhancement to virtual environments allowing users to "touch" and feel the simulated objects with which they interact. Haptics is the science of touch. The word derives from the Greek haptikos meaning "being able to come into contact with." The study of haptics emerged from advances in virtual reality. Virtual reality is a form of human-computer interaction (as opposed to keyboard, mouse and monitor) providing a virtual environment that one can explore through direct interaction with our senses. To be able to interact with an environment, there must be feedback. For example, the user should be able to touch a virtual object and feel a response from it. This type of feedback is called haptic feedback.

In human-computer interaction, haptic feedback refers both to tactile and force feedback. Tactile, or touch feedback is the term applied to sensations felt by the skin. Tactile feedback allows users to feel things such as the texture of virtual surfaces, temperature and vibration. Force feedback reproduces directional forces that can result from solid boundaries, the weight of grasped virtual objects, mechanical compliance of an object and inertia.

Conventional haptic devices (or haptic interfaces) are typically mechanical devices that mediate communication between the user and the computer. Haptic devices allow users to touch, feel and manipulate three-dimensional objects in virtual environments and tele-operated systems. Most common computer interface devices, such as basic mice and joysticks, are input-only devices, meaning that they track a user's physical manipulations but provide no manual feedback. As a result, information flows in only one direction, from the peripheral to the computer. Haptic devices are input-output devices, meaning that they track a user's physical manipulations (input) and provide realistic touch sensations coordinated with on-screen events (output). Examples of haptic devices include consumer peripheral devices equipped with special motors and sensors (e.g., force feedback joysticks and steering wheels) and more sophisticated devices designed for industrial, medical or scientific applications (e.g., PHANTOM™ device).

Haptic interfaces are relatively sophisticated devices. As a user manipulates the end effecter, grip or handle on a haptic device, encoder output is transmitted to an interface controller. Here the information is processed to determine the position of the end effecter. The position is then sent to the host computer running a supporting software application. If the supporting software determines that a reaction force is required, the host computer sends feedback forces to the device. Actuators (motors within the device) apply these forces based on mathematical models that simulate the desired sensations. For example, when simulating the feel of a rigid wall with a force feedback joystick, motors within the joystick apply forces that simulate the feel of encountering the wall. As the user moves the joystick to penetrate the wall, the motors apply a force that resists the penetration. The farther the user penetrates the wall, the harder the motors push back to force the joystick back to the wall surface. The end result is a sensation that feels like a physical encounter with an obstacle.

General-purpose commercial haptic interfaces used today can be classified as either ground based devices (force reflecting joysticks and linkage based devices) or body based devices (gloves, suits, exoskeletal devices). The most popular design on the market is a linkage based system, which consists of a robotic arm attached to a grip (usually a pen). A large variety of linkage based haptic devices have been patented (examples include U.S. Pat. Nos. 5,389,865; 5,576,727; 5,577,981; 5,587,937; 5,709,219; 5,828,813; 6,281,651; 6,413,229; and 6,417,638).

An alternative to a linkage based device is one that is tension based. Instead of applying force through links, cables are connected a point on a "grip" in order to exert a vector force on that grip. Encoders can be used to determine the lengths of the connecting cables, which in turn can be used to establish position of the cable connection point on the grip. Motors are used to create tension in the cables.

Predating Dr. Seahak Kim's work on the SPIDAR-G, Japanese Patent No. 2771010 and U.S. Pat. No. 5,305,429 were filed that describe a "3D input device" as titled in the patent. This system consists of a support means, display means and control means. The support means is a cubic frame. Attached to the frame are four encoders and magnetic switches capable of preventing string movement over a set of pulleys. The pulleys connect the tip of each encoder to strings that are wound through the pulleys. Each string continues out of the pulley to connect with a weight that generates passive tension in the string. The ON/OFF magnetic switches allow the strings to be clamped in place on command from the host computer. The strings connect to the user's fingertip, which are connected to the weights through the pulleys. The user moves his or her fingertip to manipulate a virtual object in a virtual environment, which is displayed through a monitor. As the user moves his or her fingertip, the length of the four strings change, and a computer calculates a three-dimensional position based on the number of pulses from the encoder, which indicate the change of string length between the pulleys and the user's finger. If the three-dimensional position of the fingertip is found to collide with a virtual object as determined by a controlling host computer, then the ON/OFF magnetic switch is signaled to grasp and hold each string so that movement is resisted. Forces are not rendered in a specific direction, but resistance in all directions indicates that a user has contacted a virtual object. When the fingertip is forced outside the boundary of a virtual object, the magnetic switch is turned off to release the strings. The user is then able to move his or her finger freely.

A system that combines virtual reality with exercise is described in U.S. Pat. No. 5,577,981. This system uses sets of three cables with retracting pulleys and encoders to determine the position of points on a head mounted display. Using the lengths of the three cables, the position of the point in space is found. Tracking three points on the helmet (nine cables) allows head tracking of six degrees of freedom. Three cables attached to motor and encoders are also used to control the movement of a boom that rotates in one dimension through a vertical slit in a wall. The boom also has a servomotor at its end, about which the boom rotates. It is claimed that the force and direction of force applied by the boom can be controlled via the cables, servo motor and computer software, but no details are provided for how this is accomplished. U.S. Pat. No. 5,305,429 and U.S. Pat. No. 6,630,923 describe two cables based haptic interface devices.

Haptic interface devices can be used in a variety of fields for a variety of purposes. One field where haptic interface devices are currently employed is in simulating medical procedures for training medical personnel such as doctors in new techniques and/or for allowing medical personnel to practice old techniques. The practice of old or new techniques via a haptic interface device is especially important when the techniques are complicated and/or inherently risky to patients. Normally, conventional haptic interface devices can be large and for all practical purposes non-portable. Thus, hospitals and organizations that use a conventional haptic interface device normally dedicate a room for the conventional haptic interface device. This means that persons wanting or needing to use a conventional haptic interface device must go to the dedicated room in order to practice on the conventional haptic interface device, which can be very inconvenient to the persons wanting or needing to use the conventional haptic interface device. A problem with conventional haptic interface devices is that they may be under-utilized due to the inconvenience of the user having to go to the dedicated room. Another problem is that hospitals and other organizations might not have the resources for housing the conventional haptic interface devices. Thus, there exists a need to overcome the aforementioned deficiencies.

BRIEF SUMMARY OF THE PRESENT DISCLOSURE

In one aspect, a haptic interface device comprises a first grip; a first set of a number of translation effecter devices, the first set of translational effecter devices including a first translational effecter device, a second translational effecter device, a third translational effecter device, and a fourth translational effecter device; a first set of a number of cables, each cable of the first set of cables having a first end and a second end, the first end of each first set of cables coupled to the first grip, and the second end of each first set of cables coupled to a respective one of the first set of translational effecter devices; a second grip that moves independently of the first grip; a second set of a number of translation effecter devices, the second set of translational effecter devices including a first translational effecter device, a second translational effecter device, a third translational effecter device, and a fourth translational effecter device; a second set of a number of cables, each cable of the second set of cables having a first end and a second end, the first end of each second set of cables coupled to the second grip, and the second end of each second set of cables coupled to a respective one of the second set of translational effecter devices; a translational effecter device mounting means for mounting the first set of translational effecter devices and the second set of translational effecter devices in fixed positions, the translational effecter device mounting means defining an opening having a transverse width, wherein the positions of first set of translational effecter devices are transversely offset from the positions of the second set of translational effecter devices.

In another aspect, a haptic interface device comprises a first grip configured to move within a volume of space, the first grip associated with a first movable robotic object; a second grip configured to move within the volume of space independent of the first grip, the second grip associated with a second movable robotic object; a first set of a number of translational effecter devices, each translational effecter device of the first set of translational effecter devices having a motor and a spool, each motor configured to fractionally rotate a respective one of the spools, each one of the spools of the translational effecter devices of the first set of translational effecter devices having a cable coupled thereto, each one of the respective cables coupled to the first set of translational effecter devices is coupled to the first grip, the first set of translational effecter devices including four translational effecter devices; a second set of a number of translational effecter devices, each translational effecter device of the second set of translational effecter devices having a motor and a spool, each motor configured to fractionally rotate a respective one of the spools, each one of the spools of the translational effecter devices of the second set of translational effecter devices having a cable coupled thereto, each one of the respective cables coupled to the second set of translational effecter devices is coupled to the second grip, the second set of translational effecter devices including four translational effecter devices; a frame having the first set of translational effecter devices and the second set translational effecter devices mounted thereon, the frame having a transverse width, wherein the first set of translational effecter devices are transversely offset from the second set of translational effecter devices; a first controller subsystem in direct communication with the motors of the first set of translational effecter devices and in direct communication with the motors of the second set of translational effecter devices, the first controller subsystem having a virtual reality (VR) collision detection module and a tracking module, the tracking module configured to receive signals from the first set of translational effecter devices and configured to determine a position of the first grip based upon the signals from the first set of translational effecter devices and configured to receive signals from the second set of translational effecter devices and configured to determine a position of the second grip based upon the signals from the second set of translational effecter devices, the VR collision detection module having VR primitive shapes stored therein, the VR collision detection module configured to use the VR primitive shapes to simulate a VR environment having VR objects and determine collisions between the VR objects and at least one of the first robotic object or the second robotic object based upon the received signals.

In another aspect, a haptic interface device comprises a grip configured to move within a volume of space, the grip associated with a movable robotic object; a first cable having a first end and a second end, the first end coupled to the grip; a first tool translation effecter device (translational effecter device) having coupled thereto the second end of the first cable such that, as the grip is moved within the volume of space, the first cable is retracted or paid out accordingly by the first translational effecter device; a grip dock configured to receive the first grip; and a cable lock configured to lock the first such that the locked cable cannot be further retracted or further paid out.

In another aspect, a haptic interface device comprises a grip configured to move within a volume of space, the grip associated with a movable robotic object; a set of a number of translational effecter devices, each translational effecter device of the set of translational effecter devices having a motor and a spool, each motor configured to fractionally rotate a respective one of the spools, each one of the spools of the translational effecter devices of the set of translational effecter devices having a cable coupled thereto, each one of the respective cables coupled to the set of translational effecter devices is coupled to the grip; a haptic controller subsystem in direct communication with the motors of the set of translational effecter devices, the controller subsystem having a virtual reality (VR) collision detection module and a tracking module, the tracking module configured to receive signals from the set of translational effecter devices and configured to determine a position of the grip based upon the signals from the set of translational effecter devices, the VR collision detection module having VR primitive shapes stored therein, the VR collision detection module configured to use the VR primitive shapes to simulate a VR environment having VR objects and determine collisions between the VR objects and the robotic object or the second robotic object based upon the received signals, the haptic controller subsystem configured to provide a second haptic controller subsystem with information related to the VR environment.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE PRESENT DISCLOSURE

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with systems and methods for providing virtual reality using cable based haptic interface devices have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
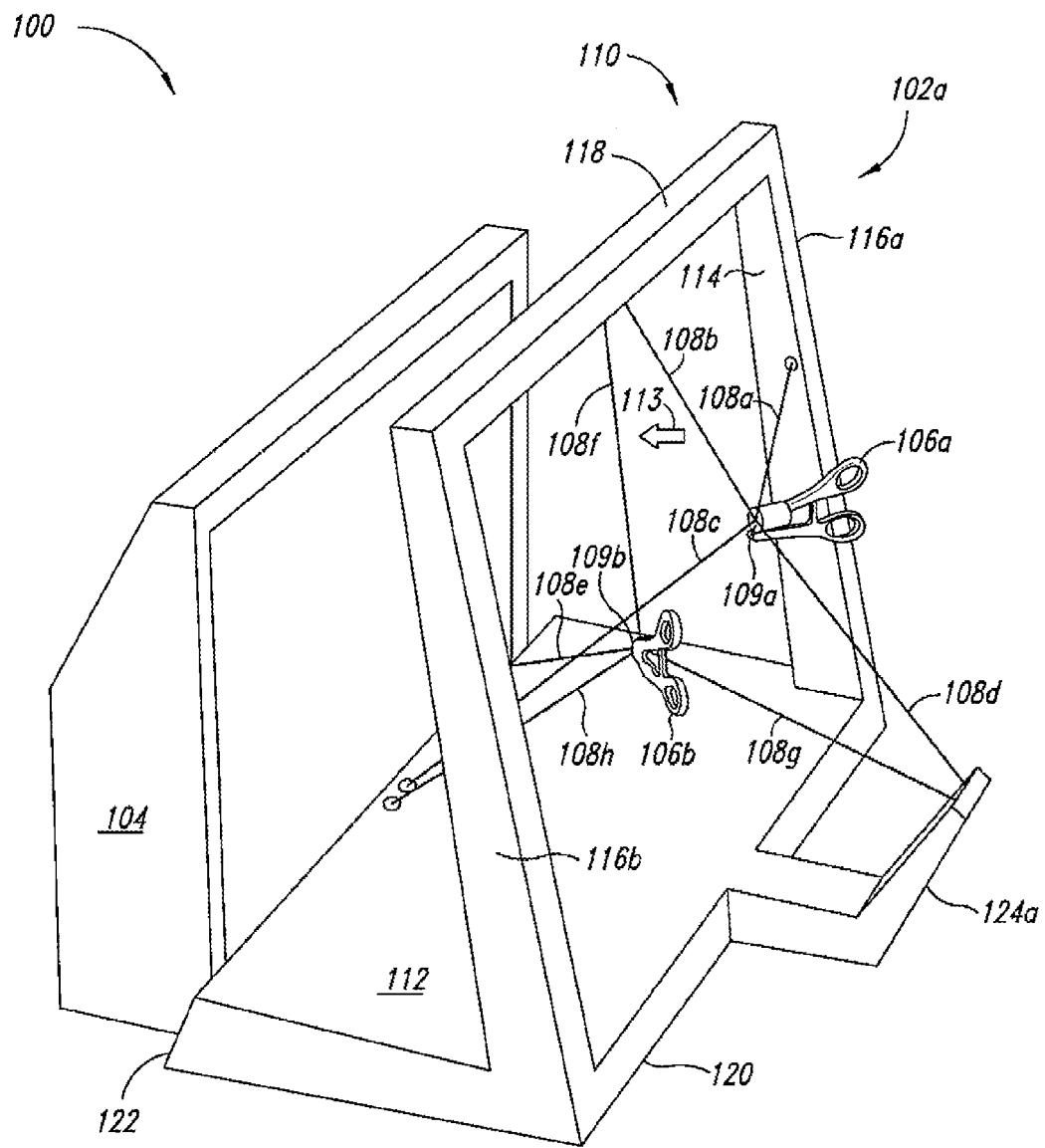
FIG. 1 is an isometric view of a dual-handed haptic interface device according to one illustrated embodiment.

FIG. 1 shows a dual-handed haptic interface device 100. The dual-handed haptic interface device 100 includes a workstation 102a and a display 104. The workstation 102a includes a frame 110 and a base 112. The base 112 defines a front side 120 and a rear side 122, which is proximal to the display 104 with respect to the front side 120. Extending from the front side 120 is a generally reclined L-shaped member 124a.

The frame 110 defines an opening 114 through which the user may view the display 104. The frame 110 includes two side arms, which are collectively referenced as 116 and individually referenced as 116a and 116b. The side arms 116 extend generally upward from the front side 120 of the base 112 and may extend slightly rearward in the direction of the rear side 122. A cross member 118 extends between the side arms 116.

In the embodiment illustrated, the display 104 is disposed behind the workstation 102a and is viewable by a user of the dual-handed haptic interface device 100. Arrow 113 represents the line of sight of a user positioned proximal to the front side 120 of the frame 110.

In some embodiments, the display 104 may be disposed beside, above, or below the workstation 102a, such that the display 104 is viewable to a user. In some embodiments, the dual-handed haptic interface device 100 may not include the display 104, and in yet other embodiments, the display 104 may be disposed or positioned such that the display 104 is partially or fully obscured to the user, or not viewable by a user.

The workstation 102a includes a pair of movable grips referenced collectively as 106 and individually referenced as 106a and 106b. Movable grips include any tool, device, etc., that a user may manipulate.

Each one of the grips 106 is coupled to the frame 110 via respective sets of four cables (collectively referenced as 108 and individually referenced as 108a-108h). Cables 108a-108d are coupled to grip 106a at an attachment end 109a, and cables 108e-108h are coupled to the grip 106b at attachment end 109b. In some embodiments, the grips 106 are removably coupled to the attachment ends so that different types of tools may be manipulated by a user.

The generally reclined L-shaped member 124a, the side arms 116, and the cross member 118 may be generally hollow and form a housing for a number of components such as, but not limited to, translation effecter devices (not illustrated in FIG. 1). Embodiments of translation effecter devices are described in U.S. Patent Publication No. US20050024331-A1, having Ser. No. 10/811,310, filed on Mar. 26, 2004, which is hereby incorporated by reference in its entirety.

In the embodiment illustrated in FIG. 1, cable 108a extends from the attachment end 109a toward the side arm 116a; cable 108b extends from the attachment end 109a toward the cross member 118; cable 108c extends from the attachment end 109a toward the rear side 122 of base 112; and cable 108d extends from the attachment end 109a toward the generally reclined L-shaped member 124a. Similarly, cable 108e extends from the attachment end 109b toward the side arm 116b; cable 108f extends from the attachment end 109b toward the cross member 118; cable 108g extends from the attachment end 109b toward the generally reclined L-shaped member 124a; and cable 108h extends from the attachment end 109b toward the rear side 122 of base 112.

Figure 2:
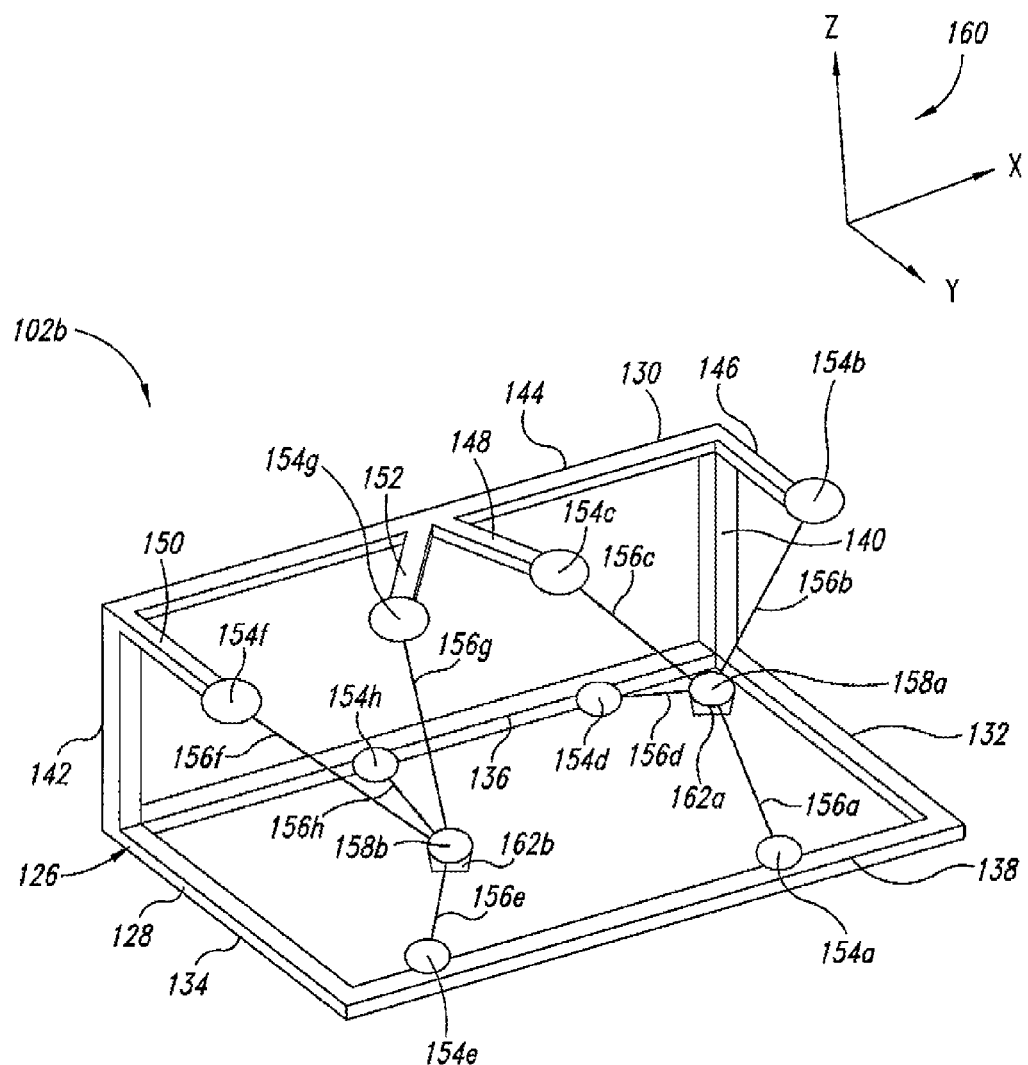
FIG. 2 is an isometric view of a dual-handed haptic interface device according to another illustrated embodiment.

FIG. 2 shows a second embodiment of a workstation 102b according to an illustrated embodiment, with the display omitted for clarity of illustration. The workstation 102b includes a skeletal frame 126 having a base 128 and support system 130. The base 128 includes opposed sides 132, 134 and opposed cross members 136, 138 extending between the sides 132, 134.

The support system 130 includes a pair of opposed support members 140, 142 extending generally upward from the base 128. A cross member 144 extends between the support members 140, 142. Arms 146, 148, 150, 152 extend outward, generally in the direction of cross member 138, from the cross member 144.

Translational effecter devices 154b, 154c, 154f, 154g are coupled to the arms 146, 148, 150, 152, respectively. Translational effecter devices 154h, 154d are coupled to the cross member 136, and translational effecter devices 154a, 154e are coupled to the cross member 138.

The relative locations of the translational effecter devices are given with reference to the Cartesian coordinate system 160. The x-axis of the Cartesian coordinate system 160 is generally parallel to the cross member 144, the y-axis of the Cartesian coordinate system 160 is generally parallel to the arm 132, and the z-axis of the Cartesian coordinate system 160 is generally parallel to the support member 140. The x-location of the translational effecter devices 154a, 154d are in between the x-locations of the translational effecter devices 154b, 154c. Similarly, the x-locations of the translational effecter devices 154e, 154h are in between the x-locations of the translational effecter devices 154f, 154g.

The y-locations of the translational effecter devices 154b, 154c are in between the y-locations of the translational effecter devices 154a, 154d. Similarly, the y-locations of the translational effecter devices 154f, 154g are in between the y-locations of the translational effecter devices 154e, 154h.

Cables 156a-156d are coupled to a first attachment end 158a, and cables 156e-156h are coupled to a second attachment end 158b. The cables are collectively referenced as 156 and individually referenced as 156a-156h, and the attachment ends are collectively referenced as 158.

Cable 156a, 156b, 156c, 156d extends from the attachment end 158a to the translational effecter device 154a, 154b, 154c, 154d, respectively. The translational effecter devices 154a-154d are each configured to pay out and retract cables 156a-156d, respectively, in response to motion of the attachment end 158a. Similarly, cable 156e, 156f, 156g, 156h extends from the attachment end 158b to the translational effecter device 154e, 154f, 154g, 154h, respectively. The translational effecter devices 154e-154h are each configured to pay out and retract cables 156e-156h, respectively, in response to motion of the attachment end 158b.

Figure 5:
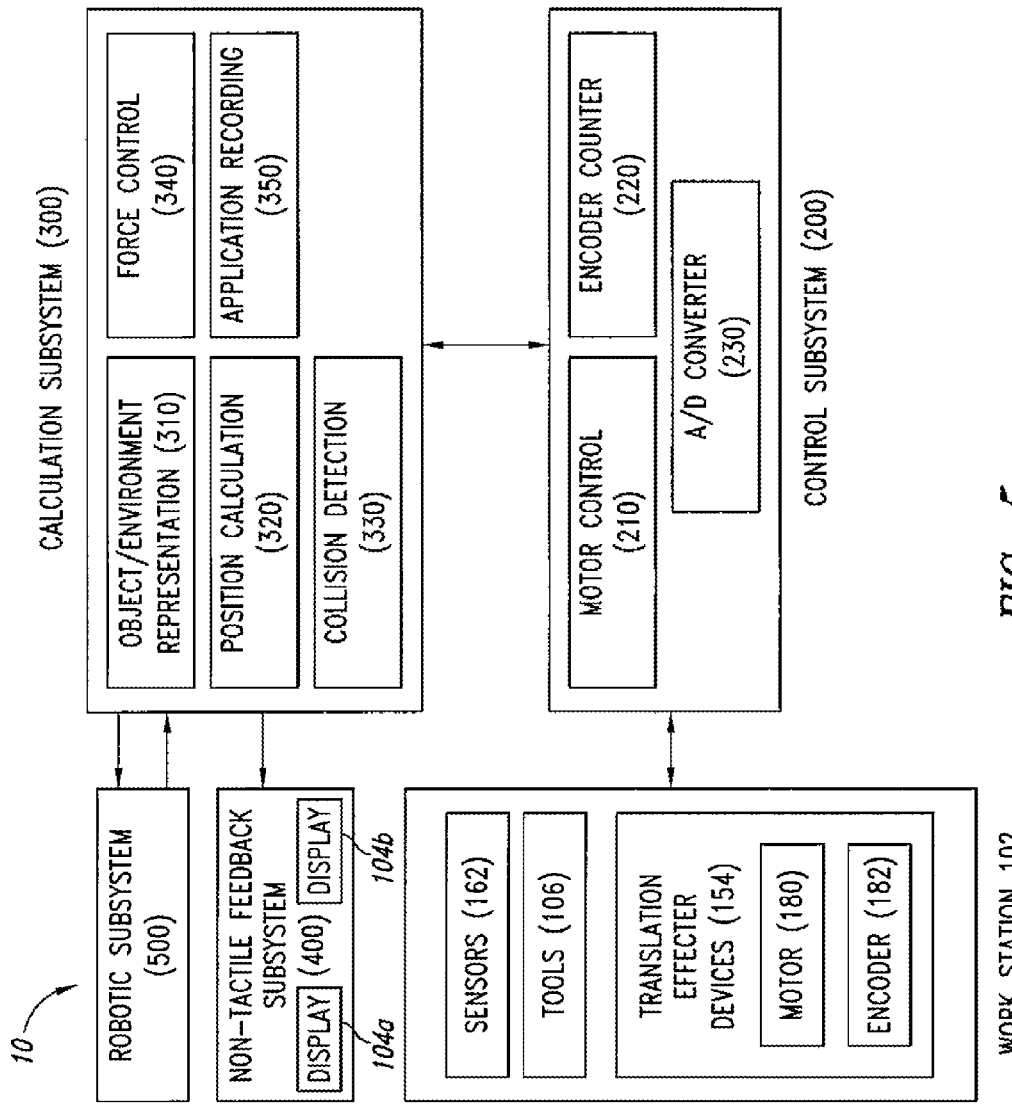
FIG. 5 is a block diagram showing selected components of a dual-handed haptic interface device and how they relate to each other according to one illustrated embodiment.

According to the embodiment illustrated in FIG. 2, each of the attachment ends 158 includes a sensor, which are collectively referenced as 162 and individually referenced as 162a, 162b. The sensors 162 may include one or more sensors, such as, but not limited to, gyroscopic sensors, acceleration sensors, infrared sensors, or electromagnetic sensors, tilt sensors which can relay signals to a control subsystem 200 (FIG. 5). The control subsystem 200 may use these signals to determine, among other things, the orientation, such as yaw, pitch, and roll, of the attachment ends 158.

In some embodiments, an additional number of cables and a corresponding number of additional translational effecter devices 154 can be used to provide one or more degrees of force feedback. Typically, for each additional degree of force feedback, an additional cable is connected to the grip and the corresponding translational effecter device is coupled to the frame. Thus, to provide orientational force feedback such as pitch, roll, and yaw for one of the grips, then three more cables would be attached to the grip. In some embodiments, information related to additional parameters of a grip and/or a tool coupled to a grip may be determined via additional cables and corresponding translational effecter devices. For example, a cable could be attached to a scissor-like handle of a tool to determine whether the scissor-like handle is open or closed.

Figure 3:
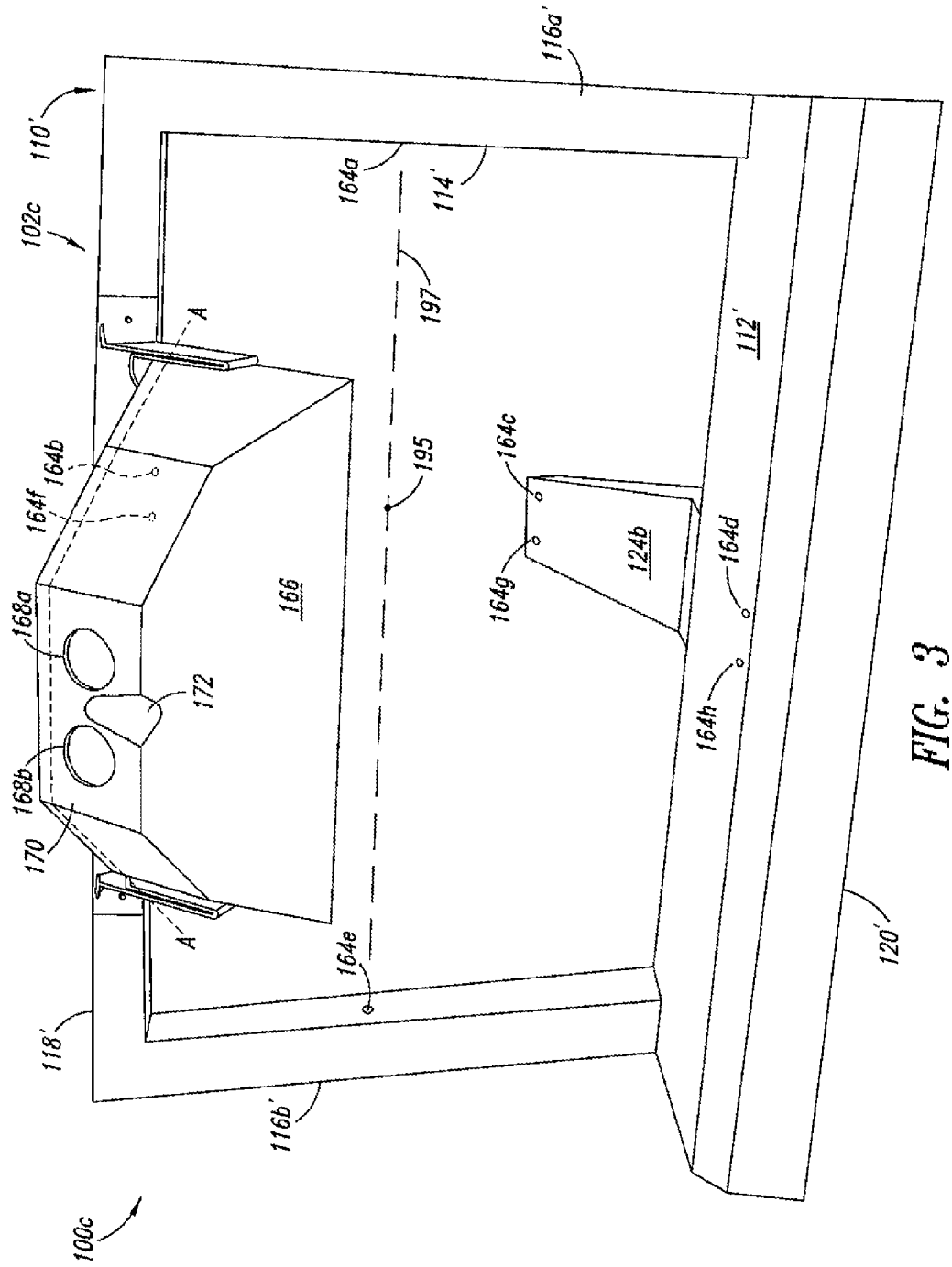
FIG. 3 is an isometric view of a work station according to one illustrated embodiment.

FIG. 3 shows another embodiment of a dual-handed haptic interface device 100c according to an illustrated embodiment, with the cables and grips omitted for clarity of illustration. In FIG. 3, the various labels having a reference numeral and a prime (') identify similar components and/or features as those of FIG. 1 that have the same reference numeral without a prime, and the various alphanumeric labels (e.g., labels having a reference numeral and a letter of the English alphabet) and a prime (') identify similar components and/or features as those of FIG. 1 that have the same alphanumeric labels without a prime.

Among other things, the dual-handed haptic interface device 100c provides a user with stereoscopic viewing and includes a workstation 102c. In some embodiments, the dual-handed haptic interface device 100c may include the display 104 (not shown in FIG. 3).

In this embodiment, the front side 120' does not have the generally reclined L-shaped member 124a extending therefrom. Instead, two cable holes individually referenced as 164d and 164h are formed in the base 112' proximal to the front side 120'. Extending rearward from the rear side 122' is a second generally reclined L-shaped member 124b. The generally reclined L-shaped member 124b has a second pair of cable holes, individually referenced as 164c and 164g. Another cable hole 164e is formed in arm 116b'. Similarly, a cable hole 164a is formed in arm 116a'. In addition, the cross member 118' includes two cable holes 164b and 164f.

The cable holes 164a-164d receive cables 108a-108d (see FIG. 1) connected to the right side grip 106a (see FIG. 1). Similarly, the cable holes 164e-164g receive cables 108e-108h (see FIG. 1) connected to the left side grip 106b (see FIG. 1).

The cable holes 164a-164d define the vertices of a first tetrahedron, and the cable holes 164e-164g define the vertices of a second tetrahedron. In some embodiments, the first and second tetrahedrons are essentially back to back. In some embodiments, the first and second tetrahedrons are approximately symmetrically disposed about a midpoint 195 of a line 197 that extends between the hole 164a and the hole 164e. In this embodiment, it should be noted that translational effecter devices are disposed within the frame 110 proximal to the cable holes 164a-164g, and consequently, the translational effecter devices also define the vertices of the two tetrahedrons.

The first tetrahedron defines the volume of space in which force feedback can be applied to the grip 106a. When the grip 106a is outside of the first tetrahedron, cable tension can be applied to pull the grip 106a back into the first tetrahedron and/or to stop the grip 106a from being moved further outside of the tetrahedron, but cable tension cannot be used to apply a force in any arbitrary direction. When the second grip 106b is outside of the second tetrahedron, the same is true for the second grip 106b. However, even when the grips 106 are outside of their respective tetrahedrons, the grips may still be tracked by the dual handed haptic interface device 100.

A stereoscope 166 is coupled to the cross member 118'. The stereoscope 166 includes a right side aperture 168a and a left side aperture 168b, both of which are formed in a front side 170. The front side 170 may be contoured with a recess 172 that is shaped to receive a nose of a user. The stereoscope 166 is positioned such that it is angled downward and rearward with respect to a user.

Figure 4:
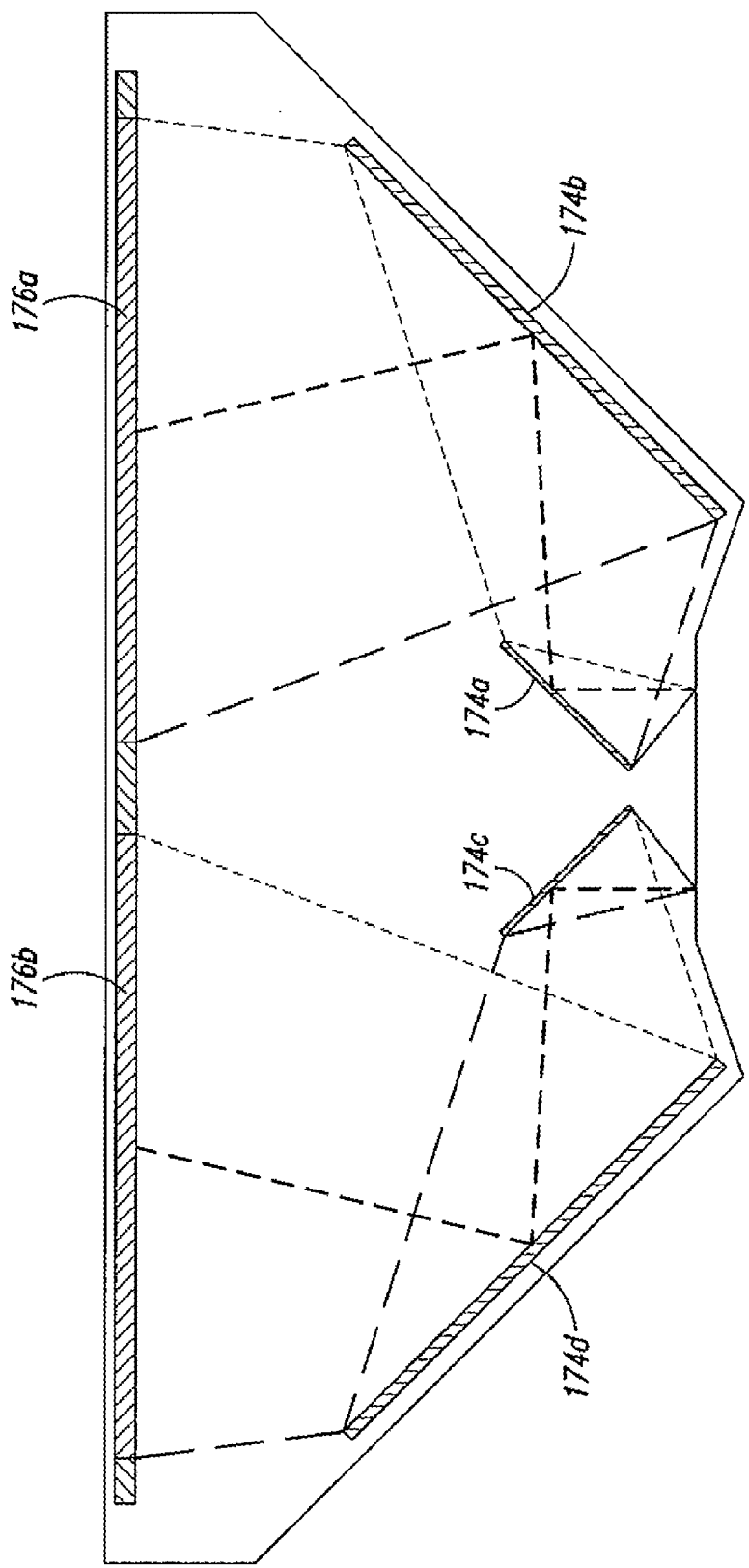
FIG. 4 is a cross-sectional view of a stereoscope according to one illustrated embodiment.

FIG. 4 shows an embodiment of the stereoscope 166 according to the illustrated embodiment as viewed along line AA of FIG. 3.

The stereoscope 166 includes right side mirrors 174a, 174b and left side mirrors 174c, 174d. The right side mirrors 174a, 174b are aligned to reflect light emitted from a right side display 176a through the aperture 168a. Similarly, the left side mirrors 174c, 174d are aligned to reflect light emitted from a left side display 176b through the aperture 168b. In some embodiments, the stereoscope 166 may include other optical components such as prisms, lenses, and/or filters. For example, prisms could replace the mirrors 174a, 174c.

In the embodiment illustrated in FIG. 4, the right and left side displays 176a, 176b could be replaced by a single display on which split screen images are displayed. The displays 176a, 176b may take the form of flat panel displays such as LCDs, plasma displays, or DPL displays. In some embodiments, the displays 176a and 176b are approximately 5 inches to 12 inches in diagonal size. This allows resolutions needed for virtual reality simulations and for appropriate refresh rates.

In some embodiments, the stereoscope 166 may be replaced by a stereoscopic viewer having optically transmissive elements such as color filters, or polarized filters, or shutters, etc. In such an embodiment, the stereoscopic viewer is positioned such that a portion of a display device (not shown in FIG. 3) may be viewable to a user of the stereoscopic viewer. The optically transmissive elements cooperate to provide a user with a stereoscopic view of the display device.

In some embodiments, stereoscopic vision may be provided by a user wearing special glasses or goggles and viewing a display device such as a monitor. For example, the user might wear "shutter-glasses" or polarized-glass or color-filter glasses. In yet other embodiments, the display device may be a stereoscopic projector or an auto stereoscope for providing stereoscopic images to a user without special glasses or goggles.

FIG. 5 shows an embodiment of a tension based force feedback system 10. The tension based force feedback system 10 includes a workstation 102, a control subsystem 200, a calculation subsystem 300, and may include an optional robotic system subsystem 500. Among other things, the control subsystem 200 converts analog and pulse signals generated by sensors (e.g., encoders) of the workstation 102 into digital signals and relays force signals to the workstation 102. Among other things, the calculation subsystem 300 controls force feedback, calculates the position of the grips 106, and mathematically represents objects and/or environments that might interact with a virtual tool. A non-tactile feedback subsystem 400 provides a user of the tension based force feedback system 10 non-tactile stimuli (e.g., visual stimuli and/or audible and/or olfactory stimuli) about the virtual tool and virtual objects and/or environments, which are modeled in the calculation subsystem 300. Among other things, the robotic subsystem 500, which in those embodiments that are so configured, receives control instructions from, and provides feedback signals to, the calculation subsystem 300.

As has been previously explained, according to some embodiments, each one of the grips 106 is removably coupled to attachment end 109 to which the cables 108 are attached. A separate grip or tool or device may then be coupled to the attachment end 109. Accordingly, the sensors 162 may be configured to detect rotations of separate grips or tools or devices attached to the attachment ends 158, as one or both of the separate grips or tools or devices moves or rotates about one or more axes.

According to another embodiment, the attachment ends 109 may include a vibration element, whose frequency and magnitude of vibration are regulated by the control subsystem 200. The vibration element may be used to create tactile effects. For example, vibration can be used to simulate different materials. For example, a dissipating vibration signal at a high frequency might be used when simulating contact with steel as compared to a dissipating vibration signal at a lower frequency, which could be used when simulating contact with wood. Suitable vibrational elements are generally known, such as those employed in paging devices and cellular phones, so will not be discussed in detail in the interest of brevity.

Each of the translational effecter devices 154 includes a motor 180 and an encoder 182. The motor 180 pays out and retracts one of the cables 108. The encoder 182 converts rotations of a shaft of the motor 180 into electrical pulses that are provided to the control subsystem 200. In some embodiments, the encoder 182 may advantageously take the form of a relative encoder avoiding the expense associated with absolute encoders.

Among other things, the control subsystem 200 receives the signals from the encoders 182 of each translation effecter devices 154, and sends control signals to the translational effecter devices 154. Typically, the control subsystem 200 includes three primary components: one or more motor controllers 210, which control tension in each of the cables 108 via the motors 180 as directed by the calculation subsystem 300; one or more encoder counters 220 that receive and count pulse signals from the encoders 182 and provides these counts to the calculation subsystem 300; and one or more A/D converters 230 that convert analog signals transmitted from each of the translation effecter devices 154 to digital signals that are relayed between the calculation subsystem 300 and the control subsystem 200.

In one embodiment, the calculation subsystem 300 includes a local processor, memory storage and associated components on a printed circuit board for implementing local software control. In other embodiments, the calculation subsystem 300 may also include a remote computer, such as a conventional Pentium processor type or workstation with conventional memory and storage means. The remote computer may transfer data to the local processor through connections such as USB, serial, parallel, Ethernet, Firewire, SCSI, Bluetooth, serial connections, or any other manner or device for transferring data at a high rate. The calculation subsystem 300 processes information via software or firmware control. The calculation subsystem 300 may include five parts or submodules: an object/environment representation module 310, a position calculation module 320, a collision detection module 330, a force control module 340, and an application record module 350.

According to one embodiment, some or all of the processing tasks, including those described with reference to the control subsystem 200 and the calculation subsystem 300, may be performed by a conventional system or workstation.

Among other things, the object/environment representation module 310 manages and controls modeling information about virtual (or real) objects, the three-dimensional environment, and the grips 106, and determines the proper interaction between the objects, the environment and the grips 106. The object/environment representation module 310 might also include information about the robotic subsystem 500, information sent from the robotic subsystem 500, and/or how movement of the grips 106 effects navigation of the robotic subsystem 500. The visual representation of these objects is relayed from the object/environment representation module 310 to the non-tactile feedback subsystem 400.

Among other things, the position calculation module 320 determines the position of the grips 106 by processing signals from the control subsystem 200 related to translation and rotational movement of one or both of the grips 106.

Among other things, the collision detection module 330 determines whether a collision has occurred between one or more modeled objects and one or both of the grips 106. This might also include an indication of existing environmental effects such as viscous resistance and inertia experienced as one or both of the grips 106 move through virtual fluid or against a virtual solid. When the system 10 is used to control a robot associated with the robotic subsystem 500, collisions may be collected from the robot as it collides with real objects.

Among other things, the force control module 340 is used to calculate tension of each one of the cables 108 that is appropriate for rendering reaction forces that take place at one or both of the grips 106. The summation of vector forces in the cables 108a-108d will equal the reaction force at the grip 106a, and similarly, the summation of vector forces in the cables 108e-108h will equal the reaction force at the grip 106b. Such forces might be the result of reaction forces collected by a robot as it interacts with real objects.

Among other things, the application record module 350 manages all other software interaction that takes place in an application that utilizes the system 10.

The non-tactile feedback subsystem 400 displays virtual objects modeled through the calculation subsystem 300. The non-tactile feedback subsystem 400 might also be used to convey visual information about real objects, such as in the case of using the system 10 to control the robotic subsystem 500 as it interacts with real objects. The non-tactile feedback subsystem 400 may include one or more display devices 104a and 104b, which may take the form of a conventional video monitor type and may be, for example, NTSC, PAL, VGA, or SVGA. The non-tactile feedback subsystem 400 may also include a head mounted display or a video projection system. The non-tactile feedback subsystem 400 may relay a 2-D representation or a stereoscopic representation for 3-D projection. The non-tactile feedback subsystem 400 might be used, for example, to collocate stereoscopic representations into the workspace of the system 10. This could be accomplished by placing the display device 104 proximal to the rear side 122 such that the face of display device 104 is viewable through the opening 114. Stereoscopic images may also be relayed through a head mounted display. The non-tactile feedback subsystem 400 may relay virtual environments where the entire environment can be classified as a rendered graphical image. The non-tactile feedback subsystem 400 may also transmit augmented environments where graphical rendering is overlaid onto video feeds or "see through" displays of real environments. The non-tactile feedback subsystem 400 could also transmit pure video of real environments, such as might be the case when the system 10 is used to control a robot operating in a real environment.

In some embodiments, the non-tactile feedback subsystem 400 may include at least two display devices 104a and 104b. One of the display devices could be used to display a "right side" image, and another one of the display devices could be used to display a "left side" image. The "right side" image and the "left side" image may be combined into a three-dimensional (3-D) stereoscopic image. Alternatively, the non-tactile feedback subsystem may use split-screen technology to display the "right side" image and the "left side" on the same display device.

In one embodiment, the system 10 performs a variety of processes. A process to establish the initial length of each of the cables 108 is achieved through processing transmitted signals between the calculation subsystem 300 and each encoder counter device 182 and by utilizing a history of encoder pulse counts from each translation effecter 154 as stored in the calculation subsystem 300. The system 10 performs the process of relaying position and orientation (e.g., roll, pitch and yaw) information about the grips 106 to the calculation subsystem 300 through optical encoders and/or sensors such as gyroscopic sensors, acceleration sensors, tilt sensors, infrared or electromagnetic tracking mechanisms located in and/or around the grips 106. The system 10 performs the process of establishing the position and orientation (e.g., roll, pitch and yaw) of the grips 106 in three-dimensional space at the calculation subsystem 300. The system 10 performs the process of determining the position and orientation of the grips 106 with the calculation subsystem 300 from the signals sent by the control subsystem 200 and/or the grips 106 to the calculation subsystem 300.

The system 10 further performs the process of establishing in the calculation subsystem 300 a force response that is appropriate at one or both of the grips 106 based on position and orientation of each of the grips 160 as each one of the grips 106 relate to virtual or real objects defined by the calculation subsystem 300. The system 10 carries out the process by determining tension values in each one of the cables 108 such that the tension in the cables 108 will deliver the force response to one or both of the grips 106 as determined by the calculation subsystem 300, and controlling tension in each one of the cables 108 by driving the motor 180 of each translation effecter devices 154 based on the tension values determined by the calculation subsystem 300. Finally, the system 10 performs the process of relaying visual and audible information via the non-tactile feedback subsystem 400 from the calculation subsystem 300 about the location and orientation of the grip 160 and virtual or real objects that the grip 106 may be interacting with.

Figure 6:
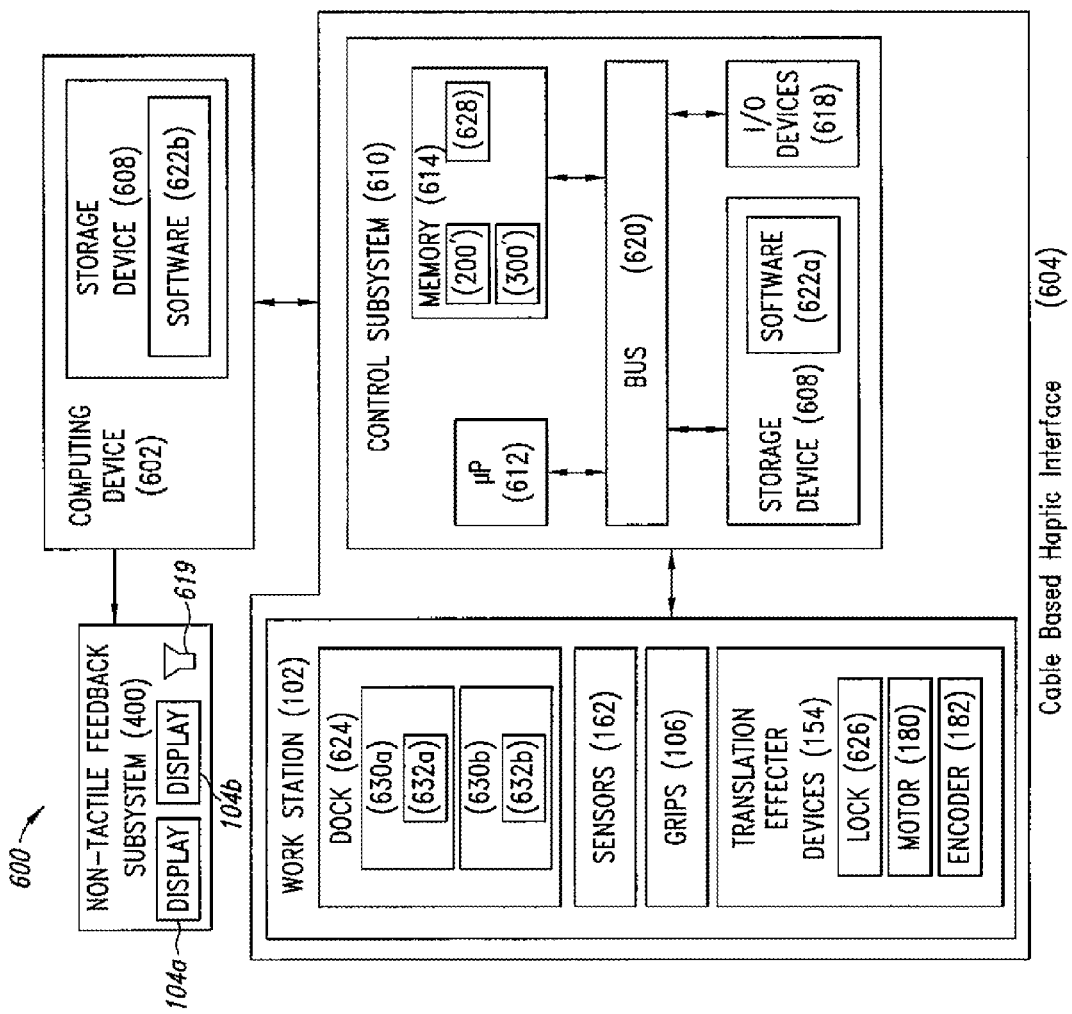
FIG. 6 is a block diagram of a haptic interface system according to one illustrated embodiment.

FIG. 6 shows an embodiment of a haptic interface system 600 according to one illustrated embodiment. In FIG. 6, the various labels that include a prime (') appended to a reference numeral (or a reference numeral and letter) identify similar components and/or features as those of prior figures that are labeled with the same reference numeral. The detailed description of such components are initially provided with respect to prior figures and for the sake of brevity the description of such components in the context of their subsequently prime-labeled counterparts in FIG. 6 are abbreviated or omitted.

The haptic interface system 600 includes a computing device 602 coupled to a cable based haptic interface 604 and coupled to a display device 400'. The computing device 602 may be a personal computer, a work station, notebook computer, etc. Software carried in a computer readable medium such as a digital video disk (DVD), a compact disk (CD), etc. may be loaded into a storage device 608 such as a hard drive of the computing device 602. The software may include instruction sets for creating a virtual reality environment.

The cable based haptic interface 604 includes a control subsystem 610 and workstation 102'. The control subsystem 610 includes a processor 612, a memory 614, a storage device 616, and input/output devices 618, all of which are coupled by at least one bus 620. The I/O devices 618 may include input devices, for example but not limited to, a keyboard, mouse, microphone, touch sensitive display, etc. Furthermore, the I/O devices 618 may also include output devices, for example but not limited to, one or more display devices 104a, 104b, speakers 619, etc. The I/O devices 618 may further include communication ports for communicating with the computing device 602. I/O devices include IEEE 1394, USB, wireless (Bluetooth, etc.), serial binary data interconnection such as RS232, infrared data association (IrDA), DVD drives, CD drives, etc. In some embodiments, the I/O devices 618 include communication ports such that the translational effecter devices 154 are in direct communication with the control subsystem 610. In some embodiments, the number of I/O devices 618 is sufficient such that each one of the translational effecter devices 154 is in direct and independent communication with the control subsystem 610. In yet other embodiments, the number of I/O devices 618 is sufficient such that components of each one of the translational effecter devices 154 is in direct and independent communication with the control subsystem 610, e.g., for a given translational effecter device 154, the motor 180 and the encoder 182 may be in separate and direct communication with the control subsystem 610 via the I/O devices 618. The I/O devices 618 may be configured to digitally control the translational effecter devices 154 and/or the motors 180.

In the embodiment illustrated, the storage device 616 includes haptic environmental software 622a. The haptic environmental software 622a may have been provided to the control subsystem 610 by the computing device 602 or may have been loaded into the storage device 616 via one of the I/O devices 618. In some embodiments, the haptic environmental software 622a or portions of the haptic environmental software 622a may be loaded into the memory via the computing device 602.

The haptic environmental software 622a loaded in the storage device 616 is typically comprised of one or more modules that are a subset of a group of modules including haptic primitives (e.g., shapes such as, but not limited to, planes, cones, spheres, cubes, triangles, cylinders, boxes, polyhedrons, surfaces defined by non-uniform rational B-splines or NURBs, etc.), haptic effects (e.g., viscosity effects, centripetal and/or centrifugal forces, force fields such a electromagnetic/electrostatic attraction/repulsion, and gravitational force, etc.), and haptic textures (e.g., smooth, rough, elastic, sand paper, etc.). Typically, the haptic environmental software 622a includes modules that relate to the VR objects included in a virtual environment. The haptic environmental software 622a mimics motions of the grips 106 in the VR environment. In operation, the haptic environmental software 622a, or portions of the haptic environmental software 622a, may be stored or buffered in the memory 614.

The calculation subsystem 300' may implement one or more modules of the haptic environmental software 622a. For example, the collision detection module (not illustrated in FIG. 6) of the calculation subsystem 300' may use the haptic primitives to determine whether a collision has occurred between one or more modeled objects and one or both of the grips 106. Similarly, the calculation subsystem 300' might also determine environmental effects such as viscous resistance and inertia experienced as one or both of the grips 106 move through a virtual fluid or against a virtual solid.

In some embodiments, calculation subsystem 300' may be configured to blend between different haptic regions or transition regions. For example, in the VR environment, there may exist a transition region between a first VR region and a second VR region. The first VR region may be best described or simulated using a first type of haptic primitive and/or a first type of haptic effect and/or a first type of haptic texture, and similarly, the second VR region may be best described or simulated using a second type of haptic primitive and/or a second type of haptic effect and/or a second type of haptic texture. In the transition region, the calculation subsystem 300' may blend the first and second haptic primitives and/or blend the first and second haptic effects and/or blend the first and second haptic textures. In one embodiment, the blending may be implemented using interpolation.

The memory 614 includes, among other things, logic for the control subsystem 200' and the calculation subsystem 300'. The object/environment representation module 310 uses the haptic environmental software 622a to, among other things, manage and control modeling information about virtual (or real) objects, the three-dimensional environment, the grips 106, and determine the proper interaction between the objects, environment and the grips 106.

The processor 612 is a hardware device for executing software, particularly that stored in memory 614. The processor 612 can be any device for executing software instructions such as an Intel Xscale® processor. Non-limiting examples of a processor device include microprocessor, application-specific integrated circuit (ASIC), and field programmable gate array (FPGA). The processor 612 executes the software stored in the memory 614 and provides the computing device 602 with display related information. In particular, display related information may include information for the VR elements that mimic the motions of the grips 106 such as the VR positions and orientations of the VR elements, information related to the VR environment such as the deformation, if any, of an VR object, etc.

The storage device 608 of the computing device 602 also includes VR software 622b. The VR software 622b may be complementary to the haptic environmental software 622a such that together the haptic environmental software 622a and the VR software 622b comprise an entire VR software packet. As previously described, the haptic environmental software 622a may include modules that relate to the VR objects and relate tactile interactions, and the VR software 622b may include modules that relate to aural output such as providing appropriate sounds for one or more of the VR elements, which relate to the one or more grips 106, interacting with one or more VR objects, or modules that relate to visual characteristics of the VR environment such as VR lighting/shadowing, color, transparency, etc.

The computing device 602 receives the display related information from the control subsystem 610. The computing device 602 uses the VR software 622b and the display related information to generate an output that is provided to the display devices 104a, 104b of the non-tactile feedback subsystem 400.

It should be noted that an advantage of system 600 is that the processes and calculations can be done in parallel. For example, the control subsystem 610 can determine the positions of one or more of the grips 106 and provide the computing device 602 with the grip position information. The computing device 602 may use the grip position information to generate the display output at the same time that the control subsystem 610 is using the position information to calculate appropriate cable tensions. Another advantage is that outputs can be provided at different refresh rates. For example, the control subsystem 610 may provide feedback to a user via tension in the cables 108 and/or via a vibration element attached to one or more of the grips 106 at one refresh rate, and the computing device 602 may provide output to the display device 400 at a second refresh rate. For example, the control subsystem 610 may control the motors 180 at a refresh rate of approximately 1000 instructions per second, while the computing device may refresh the display device 104 at only 30 Hz. Another advantage of system 600 is that legacy systems, which may have very low refresh rates can be implemented on the system 600. For example, the control subsystem 610 may provide on-board processing related to, among other things, grip location, grip tracking, grip orientation, and force feedback, which may require very fast refresh rates, and the computing device 602 may implement a legacy system having a very low refresh rate to provide the display device 400' with content. Yet another advantage of system 600 is that control subsystem 610 can perform on-board processing, and some of the processing such as, but not limited to, blending of haptic regions and collision detection are performed much faster by the control subsystem 610 than by the computing device 602. Faster collision detection prevents a user from moving a grip into and/or through a modeled solid object. If the collision detection module is being run at a low refresh rate, then a grip may be moved into and/or through a solid object before the collision detection module could detect the collision. Similarly, faster blending of haptic regions provides a user with a natural, e.g., less jerky, force feed back.

In some embodiments, the system 600 may provide jerky force feedback. The control subsystem 610 might include a snap-to module. The snap-to module can apply tensions to the cables that cause a user to feel that the grips are pulled into predetermined positions. Typically, the predetermined positions form a 3-dimensional grid. A user can use the grips 106 to manipulate modeled objects. The user might move, stretch, and rotate, etc. the modeled objects. Using force enabled "snap-to", a magnetic attraction can guide you to specific grid points or to points of interest on an object (i.e. vertices, centers, midpoints, ends, edges, etc). Force can be used to stabilize the user's movement and to provide control when scaling, shearing, aligning, translating, rotating, etc. The force feedback allows the user to sculpt objects with a consistency of clay or use pressure on a brush stroke to pain a thick line. In some embodiments, legacy software such as CAD software is loaded on the computing device 602. The computing device 602 uses the legacy software to provide images to the display 104, and the control subsystem 610 operates in parallel to regulate the haptics at a high update/refresh rate.

In this embodiment, the work station 102 includes a grip dock 624. The grip dock 624 includes grip couplers collectively referenced as 630 and individually referenced as 630a and 630b. The grip couplers 630 are configured to receive the grips 106 and releasably hold the respective grip therein. Typically, the grip couplers 630 are pressure sensitive such that the grip couplers 630 holds one of the grips 106 when that grip is placed/pressed into the grip coupler 630 and releases the grip 106 when a subsequent pressure/force is applied. The grip couplers 630 might also be magnetic. The grip dock 624 may be disposed on the base 112 of the frame 110 or on some other location of the work station 102. In some embodiments, the work station 102 may include multiple grip docks. For example, the work station 102 may include a right side grip dock for the right side grip and a left side grip dock for the left side grip.

In the embodiment illustrated, each one of the grip couplers 630a and 630b include a grip detector 632a and 632b, respectively. The grip detector 632a is configured to detect when one of the grips 106 is received by the grip coupler 630a and when the respective grip is removed from the grip coupler 630a. The grip detector 632b is similarly configured to detect when one of the grips 106 is received by the grip coupler 630b and when the respective grip is removed from the grip coupler 630b. In some embodiments, the grip detectors 632a and 632b may take the form of a pressure switch.

The grip dock 624 sends a grip received signal to the control subsystem 610 in response to one of the grips 106 being received (docked) by the grip dock 624. The grip dock 624 also sends a grip removed signal to the control subsystem 610 in response to one of the grips 106 being removed (undocked) from the grip dock 624. In some embodiments, the grip received signal and the grip removed signal identify which one of the grips 106 was docked and undocked.

In this embodiment, each one of the translational effecter devices 154 includes a lock 626. The locks 626 are configured to lock the cable of each respective translational effecter devices in stationary position in response to a lock signal from the control subsystem 610 and to release the cable in response to an unlock signal from the control subsystem 610.

In some embodiments, when the control subsystem 610 receives a grip received signal from the grip dock 624, the control subsystem 610 determines which grip was docked. The control subsystem 610 could determine which grip was docked based upon tracking information, i.e., the current positions of the grips. Alternatively, the control subsystem may determine which grip dock sent the grip received signal. Upon determining which grip was "docked" and/or which grip dock sent the grip received signal, the control subsystem 610 sends a lock signal to the locks 626 of the translational effecter devices 154 that are coupled to the "docked" grip. In response thereto, the locks 626 lock the cables in stationary position. And, when the control subsystem 610 receives a grip removed signal from the grip dock 624, the control subsystem 610 determines which grip was undocked. The control subsystem 610 could determine which grip was undocked based upon which grip was previously docked. Alternatively, the control subsystem 610 may determine which grip dock sent the grip removed signal. Upon determining which grip was undocked and/or which grip dock sent the grip removed signal, the control subsystem 610 sends an unlock signal to the locks 626 of the translational effecter devices 154 that are coupled to the undocked grip. In response thereto, the locks 626 unlock the cables.

In some embodiments, the locks 626 may be actuated to lock and unlock the cables with the grips being in any position in response to lock and unlock signals from the control subsystem 610. A user might decide to lock the cables prior to moving the work station 102 and unlock the cables after moving the work station 102. A user might cause the control subsystem 610 to send lock/unlock signals to the locks 626 by using a lock/unlock switch (not shown) or by providing a user command via the I/O devices 618.

During operation, the cables are paid out and retracted by the translational effecter devices 154, and after extended periods of use, the calculated lengths of the cables, as determined by the control subsystem 610, may be different than the actual lengths. Consequently, in some embodiments, the control subsystem 610 includes a recalibration module 628 stored in the memory 614. The recalibration module 628 is configured to calibrate calculated cable lengths. The recalibration module 628 may be engaged whenever a grip is positioned at a reference point. The recalibration module 628 knows the actual cable lengths from each of the translational effecter devices 154 to the reference point and resets the calculated cables lengths accordingly. In one embodiment, the recalibration module 628 may be automatically initiated when a grip is received by the dock 624.

In one embodiment, the memory 614 includes an operation log 628. Among other things, the operation log 628 provides a record of the forces rendered to the grips 106 and a record of the trajectories of the grips 106. The operation log 628 may be accessible to authorized personal for, among other things, diagnostic purposes.

Figure 7:
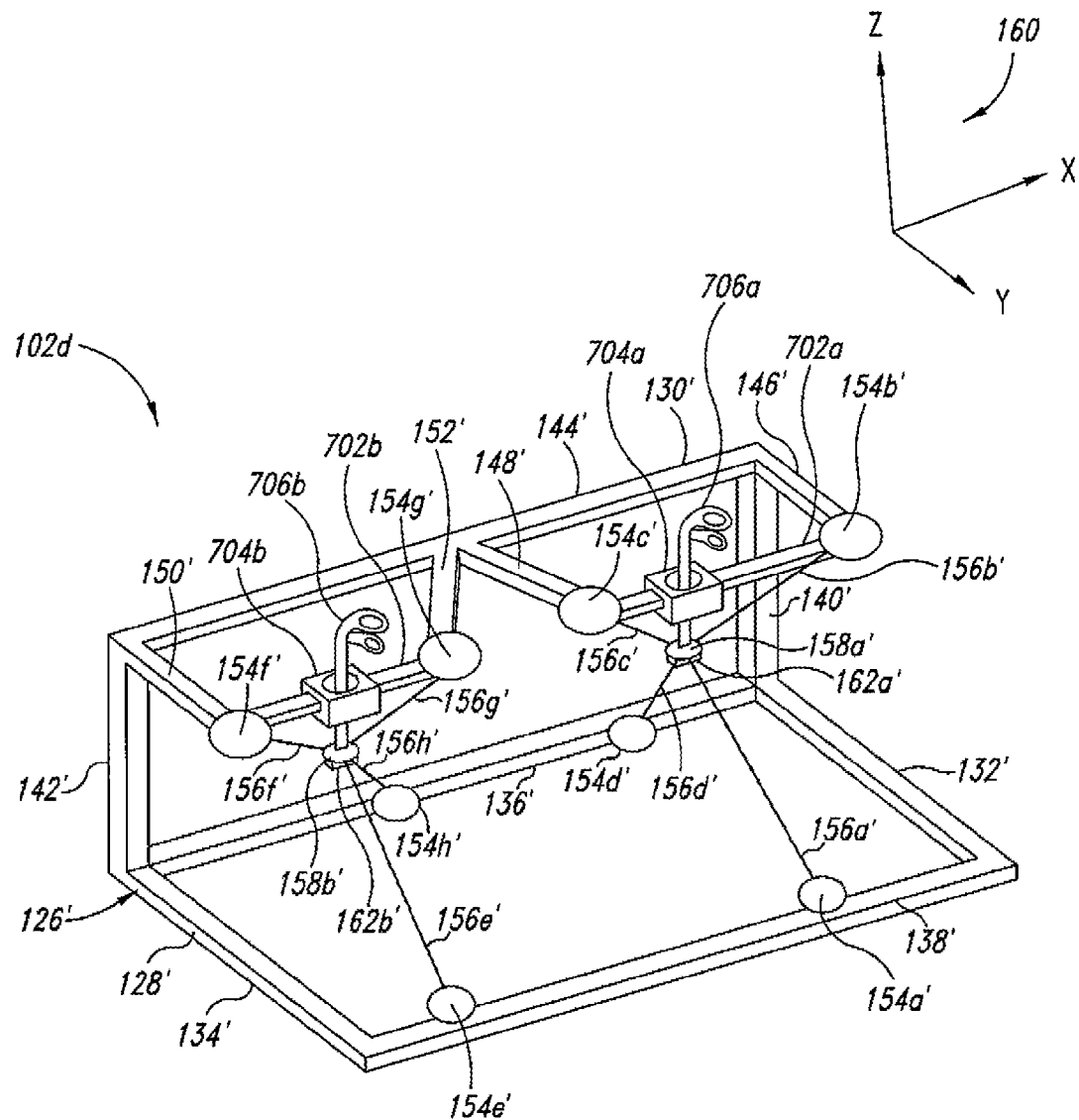
FIG. 7 is an isometric view of a dual-handed haptic interface device according to another illustrated embodiment.

FIG. 7 shows a fourth embodiment of a workstation 102*d* according to an illustrated embodiment, with the display omitted for clarity of illustration. In FIG. 7, the various labels having a reference numeral and a prime (') identify similar components and/or features as those of FIG. 2 that have the same reference numeral without a prime and the various alphanumeric labels (e.g., labels having a reference numeral and a letter of the English alphabet) and a prime (') identify similar components and/or features as those of FIG. 7 that have the same alphanumeric labels without a prime. The detailed description of such components and/or features are initially provided with respect to the embodiment of FIG. 2 and for the sake of brevity the description of such components and/or features in the context of their subsequently prime-labeled counterparts in FIG. 7 are abbreviated or omitted.

The workstation 102*d* includes a first connecting arm 702*a* that extends between support members 146' and 148' and a second connecting arm 702*b* that extends between support members 150' and 152'. A first tool coupler 704*a* is attached to the first connecting arm 702*a*, and a first tool shaft 706*a* passes through the first tool coupler 704*a*. The first tool shaft 706*a* is coupled to the first attachment end 158*a*', which has cables 156*a*'-156*d*' coupled thereto.

A second tool coupler 704*b* is attached to the second connecting arm 702*b*, and a second tool shaft 706*b* passes through the second tool coupler 704*b*. The second tool shaft 706*b* is coupled to the second attachment end 158*b*', which has cables 156*e*'-156*h*' coupled thereto.

In some embodiments, the first and second tool couplers 704*a* and 704*b* are configured to pivotally couple with the first tool shaft 706*a* and second tool shaft 706*b*, respectively. The first and second tool couplers 704*a* and 704*b* may allow three or more degrees of freedom for the first and second tool shafts 706*a* and 706*b*, respectively. For example the first tool coupler 704*a* may provide for two degrees of rotational freedom about the first tool coupler 704*a* and insertion through the first tool coupler 704*a*.

The motion of the attachment ends 158*a*' and 158*b*' is controlled through tension in cables 156*a*'-156*d*' and cables 156*e*'-156*h*', respectively. The motion of the attachment ends 158*a*' and 158*b* is such that a user will feel an insertion force (along with pitch and yaw) via the tool shafts 706*a* and 706*b*, respectively. Insertion forces are along the longitudinal length of the tool shafts 706*a* and 706*b* as confined by the tool couplers 704*a* and 704*b*. Pitch and yaw are felt on the tool shaft 706*a* and the tool shaft 706*b* with the respective pivot points at the tool couplers 704*a* and 704*b*. Such a configuration is ideal to apply three degrees of freedom force feedback to minimally invasive instruments used when simulating a surgical procedure.

More degrees of force feedback, such as rotation around the tool shaft 706*a* (or 706*b*) and grip forces at a handle of the tool shaft 706*a* (or 706*b*), can be added through additional motors and/or cables. For example, a motor in the tool shaft 706*a*, or attached to the tool coupler 704*a*, allows twisting force feedback, and a motor in a handle of the tool shaft 706*a* adds a squeezing grip force.

In some embodiments, the workstation 102*d* may include more than two tool couplers. The workstation 102*d* may be configured to allow multiple users to use the workstation 102*d* simultaneously. Such a configuration may be used to allow a team of users such as surgeons to practice complex procedures in close proximity.

Figure 8:
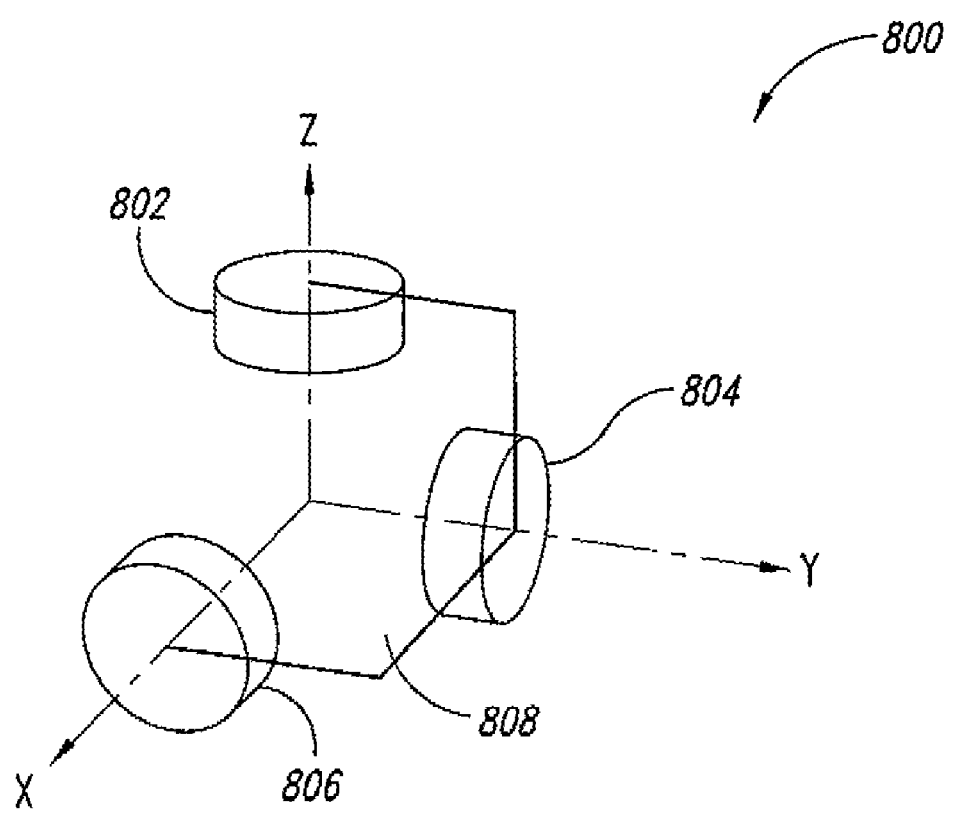
FIG. 8 is an isometric view of a sensor array according to an illustrated embodiment.

FIG. 8 shows a sensor array 800 according to one illustrated embodiment. The sensor array 800 includes three optical rotary encoders 802, 804, and 806 coupled to a gimbal-like support system 808. The three optical rotary encoders 802, 804, and 806 are arranged along three mutually orthogonal axes. The gimbal-like support system 808 is coupled to one of the cables 108 proximal to a grip 106. The three optical rotary encoders 802, 804, and 806 provide the calculation subsystem 300 with information that is used to determine the orientation (roll, pitch, and yaw) of the grip 106.

Figure 9:
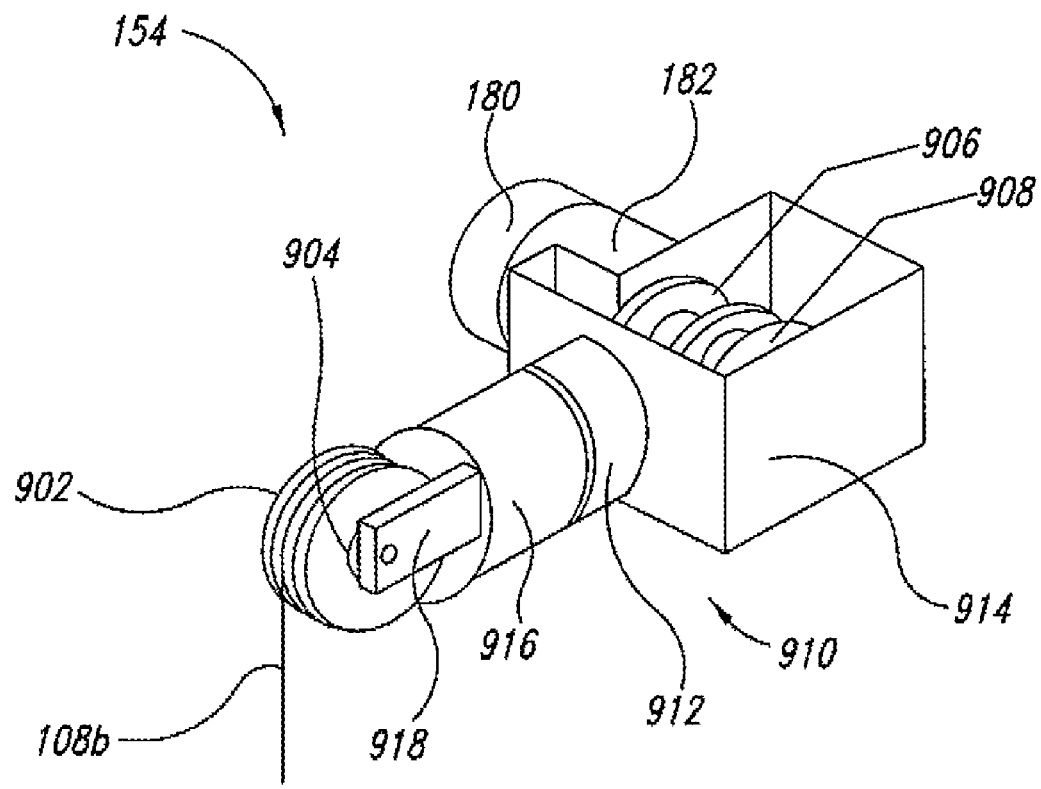
FIG. 9 is an isometric view of a translational effecter device according to an illustrated embodiment.

FIG. 9 shows a translational effecter device 154 according to one illustrated embodiment. The illustrated translational effecter device 154 is disposed within the cross member 118 of the frame 110. The illustrated translational effecter device 154 is generally representative of the other translation effecter devices included in the workstation 102 according to the one illustrated embodiment.

The translation effecter device 154 includes a pulley 902, a first bearing 904, motor 180, encoder 182, a spool 906, cable 108*b*, and a lockable motor brake 908. The lockable motor brake 908 may include the lock 626.

The translation effecter device 154 is oriented so that the spool 906 generally guides the cable 108*b* toward the grip 106*a* with the objective of minimizing friction in the cable run (i.e., path) to the grip 106*a*.

The translation effecter device 154 also includes a mounting system 910 that guides the cable 108*b* from the spool 906 to the pulley 902, while providing stability for the spool 906 and the pulley 902, such that spool 906 and the pulley 902 remain in fixed relative position when tension is applied to the cable 108b. The mounting system 910 also provides a structure to couple the translation effecter device 154 to the frame 110. The mounting system 910 also positions the pulley 902 away from both the frame 110 and the spool 906 in a manner that enables ideal use of tool workspace. The mounting system 910 may vary in size or geometry depending on workspace requirements.

The mounting system 910 includes a link 912 that is fixed to a bracket 914. A rotary fulcrum 916 is attached to link 912 through a secondary bearing. The rotary fulcrum 916 can rotate about an axis that is perpendicular to the adjacent face of link 912.

The pulley 902 is mounted to the rotary fulcrum 916 through bracket 918. The pulley 902 rotates around bearing 904, which lies between bracket 918 and the pulley 902. In addition to its attachment to link 912, bracket 914 is attached to the motor 180, the lockable brake 908, and also to the cross member 118 of the frame 110.

The motor 180 is typically a DC motor that displays minimal back drive friction and that is digitally controlled by the control subsystem 200 and/or 610. The motor 180 includes a shaft that is drivingly coupled to the spool 906, which is in turn coupled to a cable 108b. When the motor 180 turns the spool 906, the cable 108b wraps or unwraps around the spool 906. Tension occurs in the cable 108b since the cables 108a-108d pull at the attachment end 109a in opposing directions. The amount of tension in the cable 108b is based on the torque applied by the motor 180 to the spool 906 as governed by the control subsystem 200 and/or 610. In order to reduce backlash, a gear is not used, however some embodiments may include a gear where suitable.

The encoder 182 is coupled to the motor 180 and generates electrical pulses in response to rotation of the motor shaft. The electrical pulses are sent to the control subsystem 200 and/or 610. Typically, an optical encoder is used with a resolution of 1024 pulses per rotation of the motor shaft. However, a variety of optical encoders can be used that have a wide range of resolutions. An encoder is therefore chosen based on application requirements and price constraints. Determining translational movement of the grip 106a can be calculated from the length of each of the cables 108a-108d, which is determined from encoder pulse signals. There is a mathematical relationship between cable length change, diameter of the spool 906, and the pulses per rotation. The spool 906 can be made of a variety of materials, such as aluminum, steel, rigid plastic or any other stiff material.

Although not shown in any figure, a set of cables may be applied to multiple points on a grip so that different vector forces can be rendered at each point. A single calculation device can be used to control all the cable sets, or different calculation devices, for example on separate circuit boards, may be used. The effect of applying separate force vectors to different points on a single grip yields the effect of rotational forces as felt by the user, or may serve to control the movement of a jointed grip. Multiple sets of cables can also be used to apply force vectors to multiple grips that exist in the same workspace.

Although specific embodiments of and examples for the haptic system and method are described herein for illustrative purposes, various equivalent modifications can be made without departing from the spirit and scope of the present disclosure, as will be recognized by those skilled in the relevant art. The teachings provided herein of the present disclosure can be applied to other haptic systems, not necessarily the exemplary haptic system 10 generally described above.

The various embodiments described above can be combined to provide further embodiments. All of the above U.S. patents, U.S. patent application publications, U.S. patent applications, foreign patents, foreign patent applications and non-patent publications referred to in this specification and/or listed in the Application Data Sheet, including but not limited to U.S. Pat. No. 5,305,429; Seahak Kim, Masahiro Ishii, Yasuharu Koike, Makoto Sato, "Development of Tension Based Haptic Interface with 7 DOF:SPIDAR-G," ICAT2000, 25-27 Oct. 2000, National Taiwan University, Taiwan; Seahak Kim, Masahiro Ishii, Yasuharu Koike, Makato Sato, "Design of a Tension Based Haptic Interface with 6 DOF," 4th World Multiconference on Systemics, Cybernetics and Informatics (SCI2000) and the 6th International Conference on Information Systems Analysis and Synthesis (ISAS2000), Orlando, USA, in Jul. 23-26, 2000; Seahak Kim, Masahiro Ishii, Yasuharu Koike, Makoto Sato, "Development of SPIDAR-G and Possibility of its Application to Virtual Reality," VRST2000, 22-25 Oct. 2000, Seoul, Korea; Seahak Kim, Masahiro Ishii, Yasuharu Koike, Makoto Sato, "Design of tension based haptic interface: SPIDAR-G," IMECE2000 (joint with ASME2000), 5-10 Nov. 2000, Orlando, USA; Seahak Kim, Masahiro Ishii, Yasuharu Koike, Makoto Sato, "Cutting edge Haptic interface device: SPIDAR-G," Proceedings of the 32nd ISR (International Symposium on Robotics), 19-21 Apr. 2001, Seoul, Korea; Seahak Kim, Shoichi Hasegawa, Yasuharu Koike, Makoto Sato, "Tension Based 7 DOFs Force Feedback Device: SPIDAR-G" by the IEEE Computer Society Press in the proceedings of the IEEE Virtual Reality Conference 2002, 24-28 Mar. 2002 in Orlando, Fla.; Seahak Kim, Shouichi Hasegawa, Yasuharu Koike, Makoto Sato, "Tension based 7 DOF Force Feedback Device," Trans. On ICASE, Vol. 4, No. 1, pp. 8-16, 2002; Seahak Kim, Jeffrey J. Berkley, and Makoto Sato, "A Novel Seven Degree of Freedom Haptic Device for Engineering Design," Journal of virtual reality, Springer UK (accepted), are incorporated herein by reference, in their entirety. Aspects of the present disclosure can be modified, if necessary, to employ systems, circuits and concepts of the various patents, applications and publications to provide yet further embodiments of the present disclosure.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A cable based user interface, comprising:
   a first plurality of translational effecter devices and a second plurality of translational effecter devices, each translational effecter device of the first plurality of translational effecter devices and of the second plurality of translational effecter devices having an electric motor and a spool, the electric motor configured to controllably provide torque to the spool for rotating and counter-rotating the spool;
   a first plurality of cable segments and a second plurality of cable segments, each one of the cable segments of the first plurality of cable segments coupled to a spool of a respective translational effecter device of the first plurality of translational effecter devices, and each one of the cable segments of the second plurality of cable segments coupled to a spool of a respective translational effecter device of the second plurality of translational effecter devices;

a first grip and a second grip, the first grip having the first plurality of cable segments coupled thereto, and the second grip having the second plurality of cable segments coupled thereto;

a structure having a front user side and an opposed rear side separated from the front user side by a longitudinal distance, the structure defining a transverse width extending generally between opposed right and left sides of the structure, the structure providing an open workspace volume located between the front user side and the rear side and between the right and left sides of the structure, the open workspace volume sized to receive a right-hand and a left-hand of a user positioned at the front user side of the structure, the structure defining a first plurality of points and a second plurality of points, each point of the first plurality of points configured to have a respective cable segment of the first plurality of cable segments extending therefrom to the first grip, and each point of the second plurality of points configured to have a respective cable segment of the second plurality of cable segments extending therefrom to the second grip; and a grip-dock having at least one grip-coupler configured to receive at least a portion of at least one of the first grip and the second grip and further configured to releasably hold the at least one received grip thereat.

2. The cable based user interface of claim 1, wherein the at least one grip-coupler comprises a first grip-coupler configured to receive and releasably hold at least a portion of the first grip and a second grip-coupler configured to receive and releasably hold at least a portion of the second grip.

3. The cable based user interface of claim 2, wherein the first grip-coupler is a pressure sensitive grip-coupler configured to release the first grip held thereat in response to an applied pressure or applied force or is a magnetic grip-coupler configured to releasably and magnetically hold the first grip thereat.

4. The cable based user interface of claim 2, wherein the grip-dock comprises a first grip-detector and a second grip-detector, the first grip-detector configured to detect the first grip received by the first grip-dock and provide a first grip-docked signal in response to detection of the first grip, and the second grip-detector configured to detect the second grip received by the second grip-dock and provide a second grip-docked signal in response to detection of the second grip.

5. The cable based user interface of claim 4, further comprising:
a controller that provides a first lock actuation signal responsive to the first grip-docked signal and provides a second lock actuation signal responsive to the second grip-docked signal;
a first lock, wherein a first translational effecter device of the first plurality of translational effecter devices includes the first lock, the first lock is controllably actuated by the first lock actuation signal and configured to lock the cable segment coupled to the first translational effecter device of the first plurality of translational effecter devices responsive to the first lock actuation signal; and
a second lock, wherein a first translational effecter device of the second plurality of translational effecter devices includes the second lock, the second lock is controllably actuated by the second lock actuation signal and configured to lock the cable segment coupled to the first translational effecter device of the second plurality of translational effecter devices responsive to the second lock actuation signal.

6. The cable based user interface of claim 5, wherein the controller provides an unlock signal responsive to the first grip-detector having provided a grip-undocked signal, and wherein the first lock is configured to unlock the cable segment coupled to the first translational effecter device of the first plurality of translational effecter devices responsive to the unlock signal.

7. The cable based user interface of claim 6, wherein the unlock signal is a first unlock signal, wherein the controller provides a second unlock signal responsive to the second grip-detector having provided a grip-undocked signal, and wherein the second lock is configured to unlock the cable segment coupled to the first translational effecter device of the second plurality of translational effecter devices responsive to the second unlock signal.

8. The cable based user interface of claim 4, further comprising:
a controller that calibrates a reference cable segment length for each cable segment of the first plurality of cable segments responsive to the first grip-docked signal and determines, for each cable segment of the first plurality of cable segments, a dynamic cable segment length based at least in part on the corresponding reference cable segment length.

9. The cable based user interface of claim 1, wherein three points of the first plurality of points define a first plane and three points of the second plurality of points define a second plane, the first plane and the second plane extending at least partially between the front user side and the rear side of the structure, and wherein none of the three points defining the first plane are transversely aligned with another point of the three points defining the first plane, and wherein none of the three points defining the second plane are transversely aligned with another point of the three points defining the second plane.

10. The cable based user interface of claim 1, further comprising:
a controller that provides a lock actuation signal independent of a signal from the grip-dock;
a first lock, wherein a first translational effecter device of the first plurality of translational effecter devices includes the first lock, the first lock is controllably actuated by the lock actuation signal and configured to lock the cable segment coupled to the first translational effecter device of the first plurality of translational effecter devices responsive to the lock actuation signal; and
a second lock, wherein a first translational effecter device of the second plurality of translational effecter devices includes the second lock, the second lock is controllably actuated by the lock actuation signal and configured to lock the cable segment coupled to the first translational effecter device of the second plurality of translational effecter devices responsive to the second lock actuation signal.

11. The cable based user interface of claim 10, wherein the controller provides an unlock signal independent of a signal from the grip-dock, and wherein the lock of the first translational effecter device of the first plurality of translational effecter devices is configured to unlock the cable segment of the respective translational effecter device of the first plurality of translational effecter devices responsive to the unlock signal, and wherein the lock of the first translational effecter device of the second plurality of translational effecter devices is configured to unlock the cable segment of the respective translational effecter device of the second plurality of translational effecter devices responsive to the second unlock signal.

12. The cable based user interface of claim 11, further comprising:
a user-input device that provides at least one control signal for a change of a state of the locks to the controller responsive to user-input, the change of the state of the locks being either from locked to unlocked or from unlocked to lock, the controller provides either the lock signal or the unlock signal based at least on the change of the state of the locks responsive to the at least one control signal provided by the user-input device.

13. A cable based user interface, comprising:
a plurality of translational effecter devices, each translational effecter device having an electric motor and a spool, the electric motor configured to controllably provide torque to the spool for rotating and counter-rotating the spool;
a plurality of cable segments, each one of the cable segments coupled to a spool of a respective translational effecter device of the plurality of translational effecter devices;
a grip configured to be held by a hand of user and having the plurality of cable segments coupled thereto; and
a grip-dock configured to receive at least a portion of the grip and having a grip-detector configured to detect the grip received by the grip-dock and provide a grip-docked signal in response to detection of the grip.

14. The cable based user interface of claim 13, wherein the grip-dock comprises a pressure sensitive grip-coupler configured to hold the grip thereat and to release the grip held thereat in response to an applied pressure or force.

15. The cable based user interface of claim 13, wherein the grip-dock comprises a magnetic grip-coupler configured to releasably and magnetically hold the grip thereat.

16. The cable based user interface of claim 13, further comprising:
a controller that calibrates a reference cable segment length for each cable segment of the plurality of cable segments responsive to the grip-docked signal and determines, for each cable segment of the plurality of cable segments, a dynamic cable segment length based at least in part on the corresponding reference cable segment length.

17. The cable based user interface of claim 13, further comprising:
a controller configured to receive signals from the grip-dock and that provides a lock with a lock actuation signal responsive to the grip-detector having provided the grip-docked signal; and
a lock configured to receive signals from the controller and that is controllably actuated to lock a cable segment of the plurality of cable segments responsive to the lock actuation signal, wherein a given translational effecter device of the plurality of translational effecter devices includes the lock, and wherein the cable segment that is locked by the lock is the cable segment coupled to the spool of the given translation effecter device.

18. The cable based user interface of claim 17, wherein the grip-detector further configured to detect at least partial removal of the grip from the grip-dock and provide a grip-undocked signal in response to detection of the at least partial removal of the grip from the grip-dock; wherein the controller provides the lock with an unlock actuation signal responsive to the grip-detector having provided the grip-undocked signal; and wherein the lock unlocks the cable segment responsive to the unlock actuation signal.

19. The cable based user interface of claim 18, wherein the controller is configured to provide either one of the lock actuation signal or the unlock actuation signal responsive to a received signal, wherein the received signal is independent of grip-dock.

20. The cable based user interface of claim 19, further comprising:
a user-input device that provides at least one control signal for a change of a state of the lock responsive to user-input, the change of the state of the lock being either from locked to unlocked or from unlocked to lock, wherein the controller provides either the lock actuation signal or the unlock actuation signal responsive to the at least one control signal provided by the user-input device.

21. The cable based user interface of claim 17, wherein the lock prevents rotation of the spool of the given translation effecter device.

22. A cable based user interface, comprising:
a first grip configured to be gripped by a first hand of a user and a second grip configured to be gripped by a second hand of the user;
a structure having a base with a front user side and an opposed rear side separated from the front user side by a longitudinal distance, the structure defining a transverse width with the base extending generally between opposed right and left sides of the structure, the structure providing an open workspace volume located above the base and between the right and left sides of the structure, the open workspace volume sized to receive the first and the second grips and the first and the second hands of the user positioned at the front user side of the structure; and
a grip-dock located on the structure and configured to receive at least a portion of at least one of the first grip and the second grip, the grip-dock having a grip-detector configured to detect a grip received by the grip-dock and provide a grip-docked signal in response to detection of the grip received by the grip-dock.

23. The cable based user interface of claim 22, further comprising:
a first plurality of cable segments and a second plurality of cable segments, each one of the cable segments of the first plurality of cable segments coupled to the first grip, and each one of the cable segments of the second plurality of cable segments coupled to the second grip;
a first plurality of translational effecter devices, each translational effecter device of the first plurality of translational effecter devices having an electric motor and a spool having a respective cable segment of the first plurality of cable segments coupled thereto, the electric motor configured to controllably provide torque to the spool for rotating and counter-rotating the spool for winding and unwinding the respective cable segment coupled thereto, wherein at least one translational effecter device of the first plurality of translational effecter devices includes a lock that is controllably actuated by a first lock actuation signal and configured to lock the cable segment coupled to the respective translational effecter device of the first plurality of translational effecter devices responsive to the first lock actuation signal;
a second plurality of translational effecter devices, each translational effecter device of the second plurality of translational effecter devices having an electric motor and a spool having a respective cable segment of the second plurality of cable segments coupled thereto, the electric motor configured to controllably provide torque to the spool for rotating and counter-rotating the spool for winding and unwinding the respective cable segment coupled thereto, wherein at least one translational effecter device of the second plurality of translational effecter devices includes a lock that is controllably actuated by a second lock actuation signal and configured to lock the cable segment coupled to the respective translational effecter device of the second plurality of translational effecter devices responsive to the second lock actuation signal;

a controller that, independent of a signal from the grip-dock, provides the first lock actuation signal to the at least one translational effecter device of the first plurality of translational effecter devices and provides the second lock actuation signal to the at least one translational effecter device of the second plurality of translational effecter devices.

24. The cable based user interface of claim 23, wherein the controller provides a first unlock signal and a second unlock signal independent of a signal from the grip-dock, and wherein the lock of the at least one translational effecter device of the first plurality of translational effecter devices is configured to unlock the cable segment coupled to the respective translational effecter device of the first plurality of translational effecter devices responsive to the first unlock signal, and wherein the lock of the at least one translational effecter device of the second plurality of translational effecter devices is configured to unlock the cable segment coupled to the respective translational effecter device of the second plurality of translational effecter devices responsive to the second unlock signal.

25. The cable based user interface of claim 24, further comprising:

a user-input device that provides at least one control signal for a change of a state of the locks to the controller responsive to user-input, the change of the state of the locks being either from locked to unlocked or from unlocked to lock, the controller provides either the first and second lock signals or the first and second unlock signals based on the change of the state of the locks responsive to the at least one control signal provided by the user-input device.

26. The cable based user interface of claim 22, wherein the grip-detector detects the first grip when the first grip is at least partially received by the grip-dock, and further comprising:

a controller that calibrates a reference cable segment length for each cable segment of the first plurality of cable segments responsive to the grip-docked signal and determines, for each cable segment of the first plurality of cable segments, a dynamic cable segment length based at least in part on the corresponding reference cable segment length.

27. The cable based user interface of claim 22, wherein three points of the structure define a first plane, each point configured to have a respective cable segment of a first plurality of cable segments extending therefrom to the first grip, wherein three other points of the structure define a second plane, each other point configured to have a respective cable segment of a second plurality of cable segments extending therefrom to the second grip, the first plane and the second plane extending at least partially between the front user side and the rear side of the structure, and wherein none of the three points defining the first plane are transversely aligned with another point of the three points defining the first plane, and wherein none of the three points defining the second plane are transversely aligned with another point of the three points defining the second plane.

* * * * *